(12) United States Patent
Barvosa-Carter et al.

(10) Patent No.: US 7,575,807 B1
(45) Date of Patent: Aug. 18, 2009

(54) HYBRID ACTIVE DEFORMABLE MATERIAL STRUCTURE

(75) Inventors: William Barvosa-Carter, Ventura, CA (US); Thomas Stanford, Port Hueneme, CA (US); Leslie Momoda, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1065 days.

(21) Appl. No.: 10/857,465

(22) Filed: May 28, 2004

(51) Int. Cl.
*B32B 27/06* (2006.01)
(52) U.S. Cl. .................................. 428/411.1
(58) Field of Classification Search ........................ None
See application file for complete search history.

(56) References Cited

U.S. PATENT DOCUMENTS

| | | | |
|---|---|---|---|
| 5,662,294 | A | 9/1997 | Maclean et al. |
| 5,763,979 | A | 6/1998 | Mukherjee et al. |
| 5,891,577 | A | 4/1999 | Breitbach et al. |
| 6,388,043 | B1 | 5/2002 | Langer et al. |
| 2001/0006207 | A1 | 7/2001 | Caton et al. |
| 2006/0103956 | A1* | 5/2006 | Griffith et al. ............... 359/845 |

FOREIGN PATENT DOCUMENTS

GB 2280957 2/1995

OTHER PUBLICATIONS

"Shape Fixity and Shape Recovery in a film of Shape Memory Polymer of Polyurethane Series" H. Tobushi, T. Hashimoto, N. Ito, S. Hayshi, and E. Yamada, Journal of intelligent materials systems and structures 127 9 (1998).

"Shape memory materials and hybrid composites for smart systems: Part II Shape memory hybrid composites" Z.G. Wei, R. Sandstrom, S. Miyazaki, Journal of Materials Science 33 3763 (1998).

"Investigation of Shape Memory Polymers and their Hybrid Composites" C. Liang, C.A. Rogers, E. Malafeew, Journal of Intelligent Material Systems and Structures 8 380 (1997).

"Active shape control of a double-plate structures using piezoceramics and SMA wires" J.T. Oh, H.C. Park, W. Hwang, Smart Materials and Structures 10 1100 (2001).

(Continued)

*Primary Examiner*—Monique R Jackson
(74) *Attorney, Agent, or Firm*—Tope-McKay & Associates

(57) ABSTRACT

A hybrid active deformable material structure is presented. The hybrid active deformable material structure comprises a deformation unit. Each deformation unit includes a selectively deformable material structure and an actively deformable material structure in cooperation with the selectively deformable material structure. The selectively deformable structure may be caused to deform in response to a deformation of the actively deformable material structure and, when deformed, to retain a shape into which it was deformed. A plurality of deformation activation elements may be positioned about the structure to provide for multi-directional bending-type deformation, stretching-type deformation, and twisting-type deformation. The hybrid active deformable material structure may further comprise a passive material structure in cooperation with the selectively deformable material structure and the actively deformable material structure. The passive material structure may provide mechanical support for at least a portion of the selectively deformable material structure and may enclose the selectively deformable material structure.

40 Claims, 22 Drawing Sheets

OTHER PUBLICATIONS

"Super-active shape memory alloy composites" R. Barrett & R.S. Gross, Smart Materials and Structures 5 255 (1996).

"Variable stiffness mechanisms with SMA actuators" D. Siler & K.B. Demoret, Proc. SPIE—int. Soc. Opt. Eng. (USA) 2721 427 (1997).

"Progress on Composites with Embedded Shape Memory Alloy Wires" J. Schrooten, V. Michaud, J. Parthenios, G.C. Psarras, C. Galiotis, R. Gotthardt, J.-A. Manson, and J.V. Humbeeck, Materials transactions 43 961 (2002).

"Magnetic Field Sensitive Polymeric Actuators" M. Zrinyi, D. Szabo, L. Barsi, Journal of Intelligent Material Systems and Structures 9 667 (1998).

"Photostrictive Actuators" P. Poosanaas, K. Tonooka, K. Uchino, Mechatronics 10 467 (2000).

"Piezoelectric polymer composite Materials" T. Bhimasankaram, S.V. Suryanarayana, G. Prasad, Current Science 74 967 (1998).

"Ionic polymer-metal composites: I. Fundamentals" M. Shahinpoor, K.J. Kim, Smart Materials and Structures 10 819 (2001).

Peter Sommer-Larsen, Roy Kornbluh, $^3$Polymer Actuators$^2$, To appear on Actuator 2002, Jun. 2002, Bremen, Germany.

"Shape control of large lightweight mirrors with dielectric elastomer actuation" Kornbluh, R.D.; et al., D.G. Proc. SPIE—Int. Soc. Opt. Eng. (USA) , vol. 5051 , pp. 143-158 Pub.: SPIE-Int. Soc. Opt. Eng , 2003.

"Carbon Nanotube Actuators" R. J. Baughman, C. Cui, A. A. Zakhidov, Z. Iqbai, J.N. Barisci, G. M. Spinks, G.G. Wallace, A. Mazzoldi, D. De Rossi, A.G. Rinzler, O. Jaschinski, S. Roth, M. Kertesz, Science 294 1340 (1999).

D.M. Elzey, A.Y.N. Sofla, H.N.G. Wadley, University of Virginia "Shape-memory based structural actuator panels," 9th Annual International Symposium on Smart Structures and Materials, Mar. 17-21, 2002, San Diego, CA.

\* cited by examiner

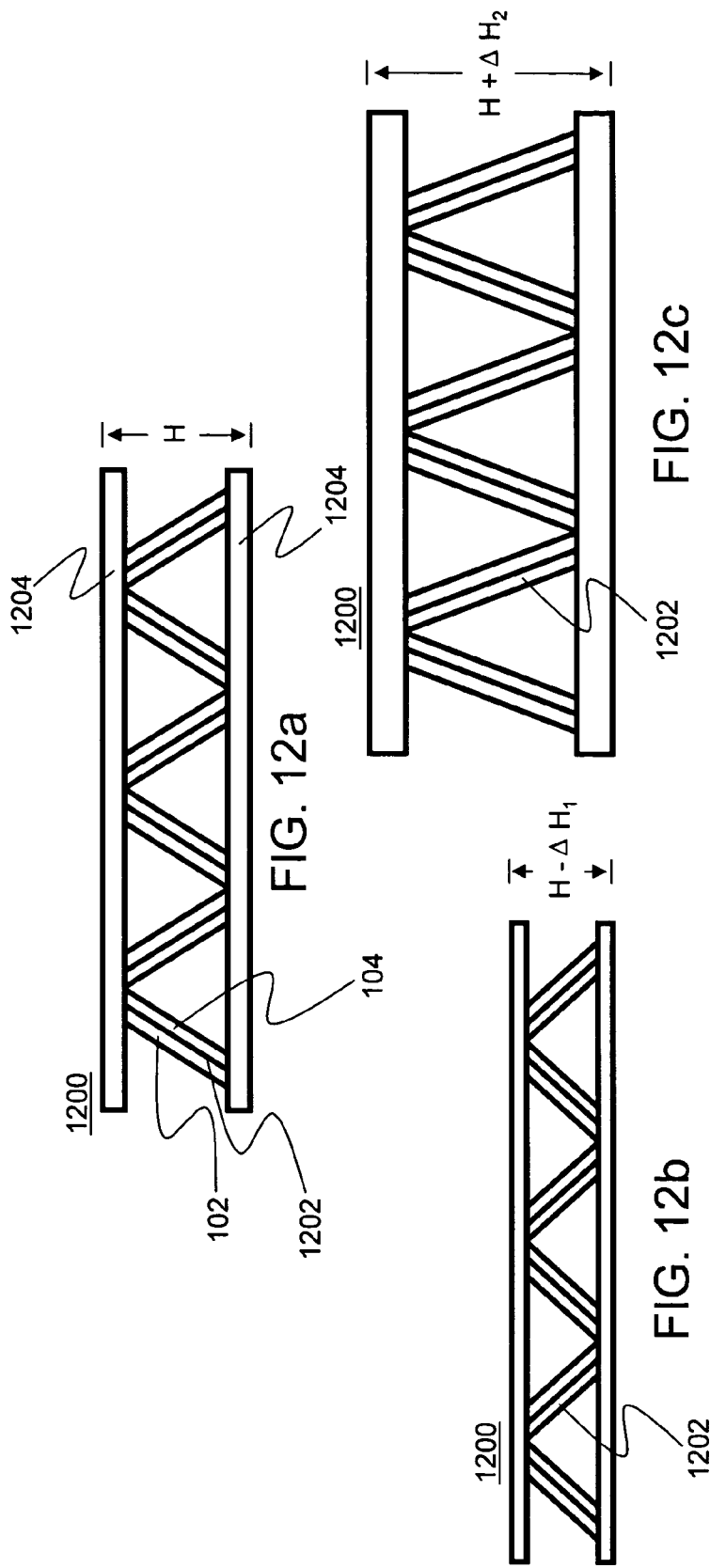

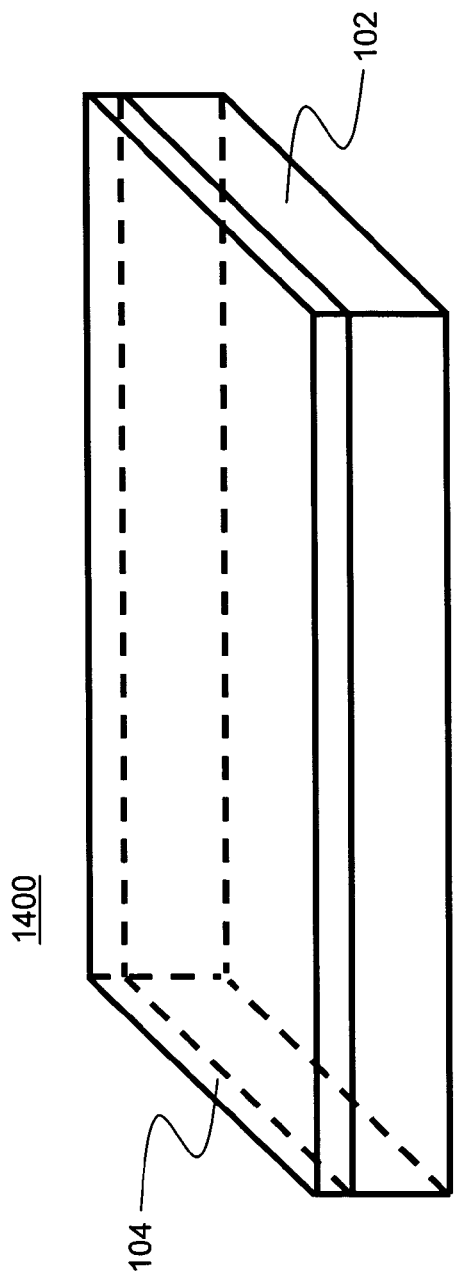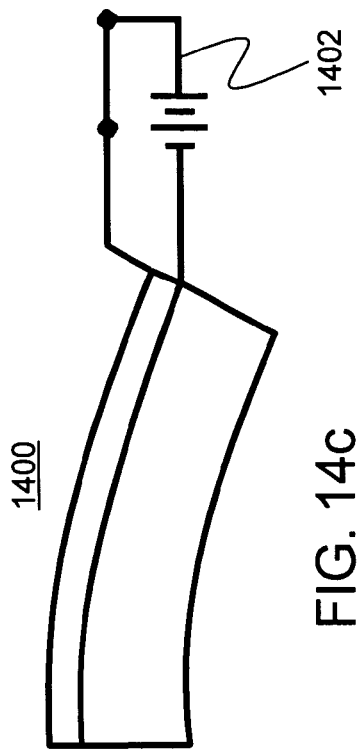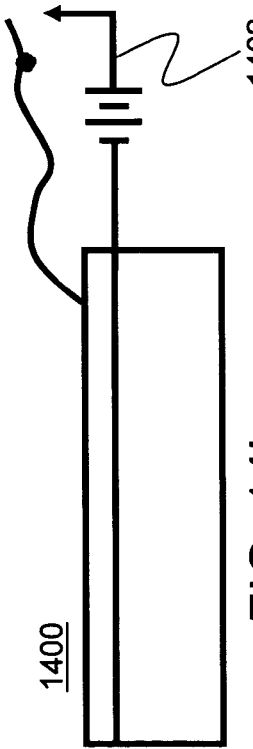
FIG. 14a
FIG. 14b
FIG. 14c

| MATERIAL | Typical activation signal | Typical signal activation element or means | Type of deformation | Typical structural forms |
|---|---|---|---|---|
| Selectively Deformable Materials: | | | | |
| SHAPE MEMORY POLYMERS | Thermal activation currently; optical, chemical, electric field, magnetic field activation proposed or being researched | Thermal: Resistive heating through bulk, heating using nearby heat source (radiative, conductive, or convective) Optical: laser, arc lamp, sunlight; may be remotely activated | Modulus reduces on heating, becomes highly elastic; can recover deformation from prior heating/deformation/cooling cycles, or cold working; constant volume material, but can be made in foam form | Film, sheet, bulk, fiber |
| Electrorheological fluids | Electric field | Parallel or coaxial electrodes; high potential | Viscosity increases | Fluid |
| Magentorheological fluids | Magnetic fields | Magents, coils | Viscosity increases | Fluid |
| Phase change materials (waxes, fluids, glass-formers, viscous materials) | Thermal | Resistive heating through bulk, heating using nearby heat source (radiative, conductive, or convective) | Viscosity or resistance to deformation decreases | Bulk |

FIG. 16a

| MATERIAL | Typical activation signal | Typical signal activation element or means | Type of deformation | Typical structural forms |
|---|---|---|---|---|
| Selectively Deformable Materials: | | | | |
| Chalcagonide glasses (e.g. a-Se, As2S3) | Thermal or optical | Resistive heating through bulk, heating using nearby heat source (radiative, conductive, or convective) Optical: laser, arc lamp, sunlight; may be remotely activated | Viscosity decreases | Bulk, film, sheet, filament |
| Baroplastics | Thermal or pressure | Resistive heating through bulk, heating using nearby heat source (radiative, conductive, or convective); pressure: must be compressed using hydrostatic external media (e.g. a hydraulic press) | Viscosity or resistance to deformation decreases | Bulk, film, sheet, filament |

FIG. 16b

| MATERIAL | Typical activation signal | Typical signal activation element or means | Type of deformation | Typical structural forms |
|---|---|---|---|---|
| Actively Deformable Materials: | | | | |
| PIEZOELECTRICS AND ELECTROSTRICTIVES | Electric field | Parallel or coaxial electrodes, high potential | May be used directly in extensional/contractile implementations; typically coupled with a passive material structure (e.g. a stiff steel backing) to produce bending or twisting action | |
| Ceramics | | | Can expand or contract when activated; | Film, rod, fiber, sheet or bulk |
| Polymers | | | Typically electrostrictive; expand when activated | Film, rod, fiber, sheet or bulk |
| SHAPE MEMORY ALLOYS | Thermal field | Resistive heating through bulk, heating using nearby heat source (radiative, conductive, or convective) | Wire, film, or foil forms typically processed to contract upon heating; can expand, bend, or twist upon activation; can be one-way (requires bias force to reset) or two-way (distinct high temperature and low temperature shapes); Foam form can be used to contract or expand on heating; may be combined with passive structure to bending or torsion geometries | Wire, film, sheet, fiber, or bulk |

FIG. 17a

| MATERIAL | Typical activation signal | Typical signal activation element or means | Type of deformation | Typical structural forms |
|---|---|---|---|---|
| Actively Deformable Materials: | | | | |
| Liquid Crystal Elastomers | Thermal, optical, Field | Resistive heating through bulk, heating using nearby heat source (radiative, conductive, or convective) Optical: laser, arc lamp, sunlight; may be remotely activated | Typical current materials contract upon heating or optical activation. | Sheet, film, rod (or "wire" like), bulk |
| MAGNETIC SHAPE MEMORY ALLOYS | Magnetic or thermal field | Magnetic field from a permenant magnet brought into proximity, or a generated using current through a coil; Also thermal (see shape memory alloys above) | Similar behavior to SMAs expected | Bulk, film, wire, rod |
| MAGNETOSTRICTIVES | | Magnetic field from a permenant magnet brought into proximity, or a generated using current through a coil; | Can expand or contract depending on mechanical bias; may be combined with passive structure to bending or torsion geometries | Film, bulk, powder composite |

FIG. 17b

| MATERIAL | Typical activation signal | Typical signal activation element or means | Type of deformation | Typical structural forms |
|---|---|---|---|---|
| Actively Deformable Materials: | | | | |
| ELECTROACTIVE AND IONIC POLYMERS | | | | |
| Electronic EAPs (dielectric elastomers) | Electric field | Parallel or coaxial electrodes: typically conductive through large (>100%) deformations; high voltages | Expand along length or in plane of electrodes; may be combined with passive structure to bending or torsion geometries | Film or coaxial |
| Ionic Polymer Metal Composites (IPMCs) | Electric field, chemical field | Parallel or coaxial electrodes; low voltages; changes in chemical environment (e.g. applied via flowing fluid or gas, or changes in background environment) | Bending or torsion inherent to material | Sheet |
| Ionic Polymer Gels | Electric field, chemical field | Parallel or coaxial electrodes; low voltages; changes in chemical environment (e.g. applied via flowing fluid or gas, or changes in background environment) | Volume expansion; can be constrained to produce linear or planar motion, extension or contraction; may be combined with passive structure to bending or torsion geometries | Film, sheet, bulk |

FIG. 17c

| MATERIAL | Typical activation signal | Typical signal activation element or means | Type of deformation | Typical structural forms |
|---|---|---|---|---|
| Actively Deformable Materials: | | | | |
| Conductive polymers | Electric current, chemical field | Applied using battery, power cell, etc... | Extension or contraction; may be combined with passive structure to bending or torsion geometries | Film, sheet, filament, rod |
| Carbon nanotube actuators | Electric field, chemical field | Parallel or coaxial electrodes; low voltages; changes in chemical environment (e.g. applied via flowing fluid or gas, or changes in background environment) | Extension or contraction; may be applied to bending or torsion geometries with passive structure | Typically a composite with a polymer matrix; film, sheet, filament, rod |
| PHOTOSTRICTIVES | Light | Laser, arc lamp, sunlight; may be remotely activated | Can contract or expand depending on configuration | Bulk, film, sheet, rod, "wire" |

FIG. 17d

HYBRID ACTIVE DEFORMABLE MATERIAL STRUCTURE

BACKGROUND OF THE INVENTION (1) Technical Field

The present invention relates to materials that respond to external stimuli either actively by changing their shape or passively by changing their mechanical properties. More specifically, the present invention relates to such "active materials" (materials that change shape in response to stimuli) and "passively shapeable materials" (materials that are controllably malleable) that are used in combination to permit the re-shaping of a device into at least one desired shape.

(2) Description of Related Art

The field of smart materials and intelligent structures has been gradually developing over the past few decades, increasingly enabled by technological advances in the areas of sensors, engineering materials, and actuators. The basis of many actuator and sensor technologies has increasingly been found in emerging "active materials." Active materials, as a category, are materials that change their shape in response to an external control stimulus, typically a field, such as a thermal, magnetic, or electric field, but also radiation (light) or a changing chemical environment. Materials in this broad category include several classes, often delineated by the stimulus and material type: shape memory alloys, shape memory polymers, piezoelectric ceramics, magnetostrictives, and electroactive polymers. Within each of these classes, there are many materials; e.g., within electroactive polymers alone there are a wide variety of low- and high-voltage activated materials with widely varying properties, such as ionic-polymer metal composites, conductive polymers, gels, and others.

One class of active materials, those with shape memory, has been studied since the 1950s. The broad class of materials with shape memory includes materials such as shape memory polymers (SMPs) and shape memory alloys (SMAs). In particular, nitinol and other alloys that possess memory properties have been used in applications from catheter wires to eyeglasses. Discovered more recently, SMPs, on the other hand, have distinct advantages over SMAs. Typically, changes in chemical formulation enable a wider range of transformation temperatures and are more suitable to applications such as in surgical instruments. To-date, most applications of SMPs and SMAs have been distinct, for example, they have not been applied in a manner that would take advantage of the beneficial properties of both in a synergistic manner.

Often, for the purpose of controlling the fixed shape of a structure, active materials have been paired with or used in a composite structure with passive engineering materials to form an "active structure." Upon activation, the overall shape of the structure becomes defined by a balance between the forces developed by the active material and the elastic energy stored in the passive engineering material structure.

An example of the state of the art in the patent literature which uses this principle is presented in U.S. Patent Publication No. 20010006207 by Caton et al., wherein the applicants describe the concept of SMA ribs in a passive elastomeric matrix for aircraft control surfaces. In the device described by Caton et al., elastomeric panels are moved between two positions by force exerted by a set of actuating ribs. In this case, power must be continuously applied to the SMA ribs to maintain the structure in the activated state.

In another example of related art, US Application 20020142119 "Shape memory alloy/Shape memory polymer tools" teaches the use of composite shape memory alloy (SMA), shape memory polymer (SMP) and combinations of SMAs and SMPs to produce catheter distal tips, actuators, etc., which are bistable. In this application, the SMA material is stabilized by the SMP material, and power-off hold can be accomplished using the SMP material. However, within the scope of the invention, the structure is generally limited in conception to structures with two states.

Other current literature in the art includes UK Pat. No. GB2280957, titled "A Surface Device Configurable by Shape Memory Actuation," by Taylor et al. In the description by Taylor et al., individual sections of a surface are actuated between two positions using the one-way SMA effect to form a reconfigurable surface. Fluid pressure or springs are used to return a surface and a set of SMA tendons to their original position. In order to maintain the surface shape, the SMA wires must be continuously powered. Such controllable structures based on SMA materials suffer from a major drawback: while SMA materials are capable of high force actuation, the strength of the SMA material reduces considerably in its 'power off' state.

In many cases, power must be continuously applied to the structure, and such a requirement may limit the applicability of a particular "active structure" approach. It is possible to utilize the high and low temperature forms of an SMA. An example of a device that incorporates this concept and that uses a combination of, parts made of SMAs (coupled with a passive truss structure) was developed by the group at University of Virginia, led by Prof. Hayden Wadley, in the area of actively controlled cantilevers. A presentation from the Wadley group was made at the $9^{th}$ Annual International Symposium on Smart Structures and Materials 17-21 Mar. 2002, San Diego, Calif., entitled "Shape-memory based structural actuator panels" by D. M. Elzey, A. Y. N. Sofia, H. N. G. Wadley, University of Virginia. In this presentation, a structure was described that consisted of a pair of SMA panels connected by a truss structure to form a cantilever. This structure could be actuated, enabling the position of the end of the cantilever to be controlled. With power off, the structure would then hold its shape. The major disadvantage of this structure is that the zero-power hold feature depends on the mechanical properties of the SMA when it is cold, which can be very poor.

While the above description is limited to SMA materials, similar examples and arguments can be made regarding active structures that utilize piezoelectric ceramics and polymers, magnetostrictive materials, electroactive polymers (such as dielectric elastomers, ionic polymer-metal composites, or ionic polymer gels), or liquid crystal elastomers. In certain cases, it is possible to utilize bi-stable structures to enable a structure to be transformed by the active material from one shape to another shape, but such bi-stable structures can be limited in that typically only two basic shapes can be held with reasonable stability; additionally bi-stable structures are limited in that sufficient external forces can overcome the bi-stability and cause undesirable switching between the two shapes.

In light of the above, there exists a need in the art for a material system that can achieve a broad range of shapes and that provides a reconfigurable surface that holds its shape without power. It is further desirable that the element system be capable of self-resetting via antagonistic action.

SUMMARY OF THE INVENTION

In one aspect, the present invention teaches a hybrid active deformable material structure comprising a deformation unit. The deformation unit comprises a selectively deformable material structure; and an actively deformable material structure in cooperation with the selectively deformable material structure, whereby the selectively deformable structure may be caused to deform in response to a deformation of the actively deformable material structure and, when deformed, to retain a shape into which it was deformed.

In another aspect of the present invention, the selectively deformable material structure is formed of at least one material selected from a group consisting of amorphous solids, phase-transition materials, viscoelastic materials, plastically deforming materials, waxes, water, thermoplastics, glass-forming oxides, polymers, amorphous metals, amorphous semiconductors, shape memory polymers, electrorheological fluids, magnetorheological fluids, electrorheological elastomers, baroplastics, and magnetorheological elastomers.

In still another aspect of the present invention, the actively deformable material structure is formed of at least one material selected from a group consisting of liquid crystal elastomers, shape memory alloys, magnetostrictive materials, electrostrictive materials, piezoelectric ceramics and polymers, electroactive polymers, ionic polymer gels, ionic polymer metal composites, dielectric elastomers, conductive polymers, carbon nanotubes, and ferrogels.

In yet another aspect of the present invention, the actively deformable material structure includes a plurality of deformation activation elements positioned about the selectively deformable material to allow for a deformation type selected from a group consisting of multi-directional bending-type deformation, stretching/contracting-type deformation, and twisting-type deformation.

In a further aspect of the present invention, the actively deformable material structure further comprises a passive material structure in cooperation with the selectively deformable material structure and the actively deformable material structure.

In another aspect of the present invention, the passive material structure provides mechanical support for at least a portion of the selectively deformable material structure.

In still another aspect of the present invention, the passive material structure encloses at least a portion of the selectively deformable material structure.

In yet another aspect of the present invention, the passive material structure comprises a plurality of deformation units.

In a further aspect of the present invention, the passive material structure encloses at least one deformation unit.

In yet a further aspect of the present invention, the passive material structure further comprises a deformation activation element functionally connected with the selectively deformable material structure, whereby the deformation activation element may apply a stimulus to the selectively deformable material structure.

In another aspect of the present invention, the deformation activation element is embedded in the selectively deformable material structure.

In yet another aspect of the present invention, the deformation activation element comprises a plurality of addressable activation units corresponding to various ones of the deformation units, whereby a stimulus may be selectively applied to different deformation units.

In a further aspect of the present invention, the selectively deformable material structure sets through a non-reversible mechanism.

In still a further aspect of the present invention, the selectively deformable material structure is formed of a material selected from a group consisting of photopolymerizable materials, curable materials, irreversibly cross-linkable polymers, additively-induced curing materials, subtractively-induced curing materials, reactively-induced curing materials, signal-catalytically curing materials, crystallizing materials, sol gels, and thermally curing materials.

In still another aspect of the present invention, the passive material structure includes a support portion for maintaining a geometric relationship between at least two of the actively deformable material structures, the selectively deformable material structure, and an activation structure comprised of deformation activation elements.

In yet another aspect of the present invention, the selectively deformable material structure is stimulated through heat and the deformation activation element is a heating element.

In a further aspect of the present invention, the selectively deformable material structure further comprises a deformation activation element functionally connected with the actively deformable material structure, whereby the deformation activation element may apply a stimulus to the actively deformable material structure.

In still another aspect of the present invention, the passive material structure sets through a non-reversible mechanism.

In yet still another aspect of the present invention, the passive material structure is formed of a material selected from a group consisting of photopolymerizable materials, curable materials, irreversibly cross-linkable polymers, additively-induced curing materials, subtractively-induced curing materials, reactively-induced curing materials, signal-catalytically curing materials, crystallizing materials, sol gels, and thermally curing materials.

In another aspect, the present invention teaches a method for making a hybrid active deformable material structure comprising acts for forming a deformation unit. First, an act of providing a selectively deformable material structure is performed. Next, an act of placing the selectively deformable material structure and actively deformable material structure in functional cooperation with the selectively deformable material structure is performed, whereby the selectively deformable structure may be caused to deform in response to a deformation of the actively deformable material structure and, when deformed, to retain a shape into which it was deformed.

In a further aspect of the present invention, the selectively deformable material structure comprises further acts of forming a deformation unit by placing a deformation activation element functionally connected with the selectively deformable material structure, whereby the deformation activation element may apply a stimulus to the selectively deformable material structure.

In a still further aspect of the present invention, the selectively deformable material structure comprises further acts of forming a deformation unit by functionally connecting a deformation activation element with the actively deformable material structure, whereby the deformation activation element may apply a stimulus to the actively deformable material structure.

In still another aspect of the present invention, the selectively deformable material structure comprises further acts of forming a deformation unit by providing passive material structure in cooperation with the selectively deformable material structure and the actively deformable material structure.

In yet another aspect, the present invention teaches a method for actuating a hybrid active deformable material structure comprising acts for deforming a deformation unit. The deformation unit comprises an actively deformable material structure in functional cooperation with a selectively deformable material structure. Deformation is caused by: (1)

stimulating the selectively deformable material structure to cause the selectively deformable material structure to become malleable; (2) stimulating an actively deformable material structure, causing the deformation unit to deform to a desired shape; and (3) de-stimulating the selectively deformable material structure to cause the deformation unit to retain the shape into which it was deformed.

BRIEF DESCRIPTION OF THE DRAWINGS

The objects, features and advantages of the present invention will be apparent from the following detailed descriptions of the preferred aspect of the invention in conjunction with reference to the following drawings where:

FIG. 12a is an illustration of a truss-type material structure according to the present invention, where elements of the structure are capable of expansion and contraction;

FIG. 12b is an illustration of a truss-type material structure as shown in FIG. 12a, in a contracted state;

FIG. 12c is an illustration of a truss-type material structure as shown in FIG. 12a, in an expanded state;

FIG. 12d is an illustration of a truss-type material structure as shown in FIG. 12a, in a selectively expanded/contracted state;

FIG. 14a is an illustration of a material structure according to the present invention that is capable of planar extension-type single-axis bending;

FIG. 14b is an illustration of a material structure as shown in FIG. 14a, showing attached circuitry and depicted in an unbent state;

FIG. 14c is an illustration of a material structure as shown in FIG. 14b, depicted in a bent state;

FIGS. 16a and 16b are tables presenting various characteristics of examples of selectively deformable materials that can be used in the formation of deformation units according to the present invention; and FIGS. 17a-17d are tables presenting various characteristics of examples of actively deformable materials that can be used in the formation of deformation units according to the present invention.

DETAILED DESCRIPTION

Figure 1A:
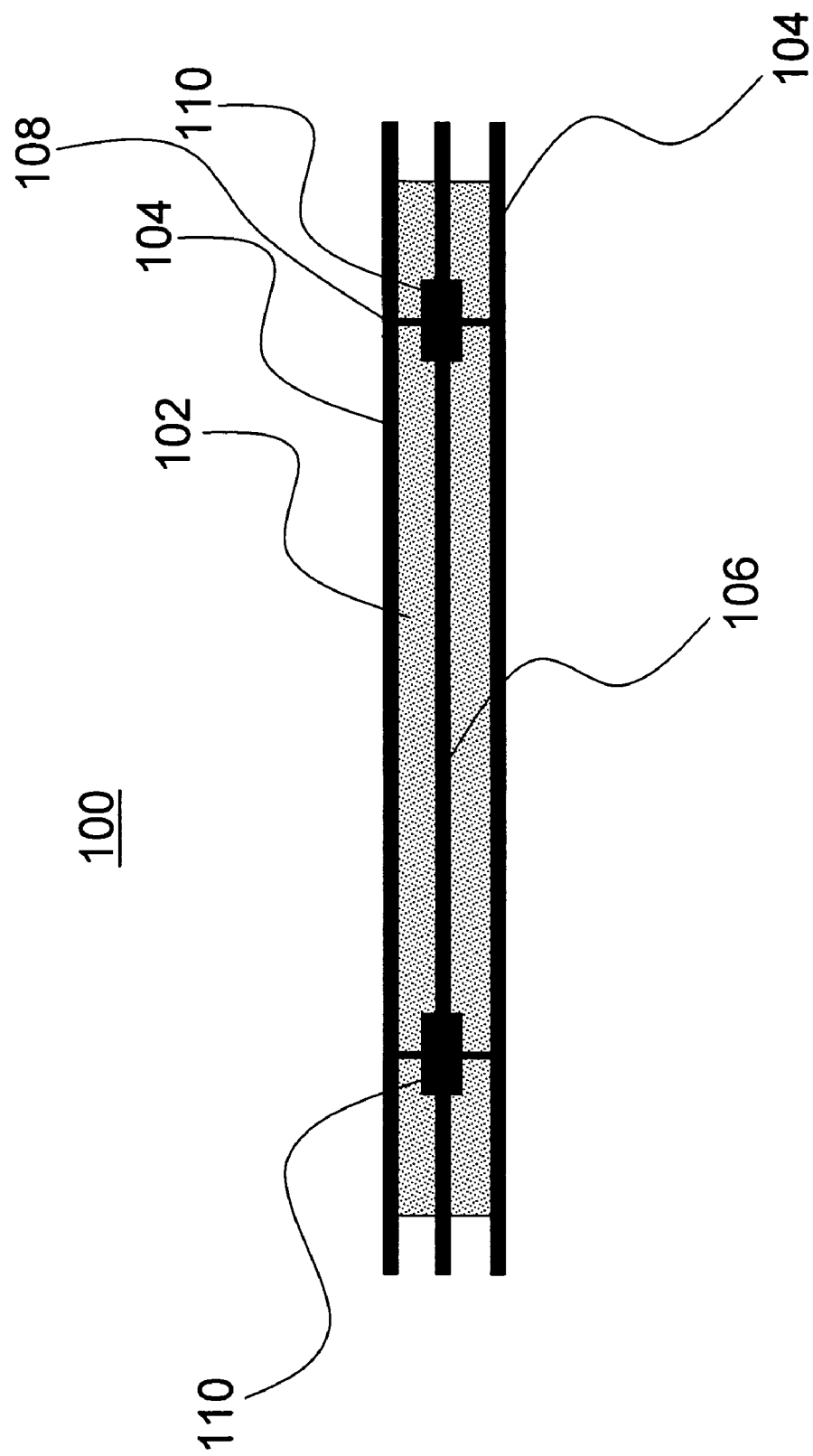
FIG. 1a is a cross-sectional view of a hybrid active deformable material structure according to the present invention in an un-deformed state.

The field of smart materials and intelligent structures has been gradually developing over the past few decades, increasingly enabled by technological advances in the areas of sensors, engineering materials, and actuators. The basis of many actuator and sensor technologies has increasingly been found in emerging "active materials." Active materials, as a category, are materials that change their shape in response to an external control stimulus, typically a field, such as a thermal, magnetic, or electric field, but also radiation (light) or a changing chemical environment. Materials in this broad category include several classes, often delineated by the stimulus and material type: shape memory alloys, shape memory polymers, piezoelectric ceramics, magnetostrictives, and electroactive polymers. Within each of these classes, there are many materials; within electroactive polymers alone there are a wide variety of low- and high-voltage activated materials with widely varying properties, such as ionic-polymer metal composites, conductive polymers, gels, and others.

Another way to categorize these materials is by mechanical response. While all active materials change some property in response to an external control stimulus, generally the material will either transduce that stimulus into a shape change or a mechanical property change, or a combined shape and mechanical property change. For most materials, however, there is a range of useful response. In the case of the present invention, materials that have a large shape change or actuation response upon activation are placed in the category of "actively deformable materials." For purpose of illustration, thermally-activated materials with so-called "shape memory" will be discussed herein. However, it is important that the reader understand that many other materials may be used within the scope of the invention.

The present invention relates to materials that respond to external stimuli either actively by changing their shape or passively by changing their mechanical properties. More specifically, the present invention relates to such "active materials" (materials that change shape in response to stimuli) and "passively shapeable materials" (materials that are controllably malleable) that are used in combination to permit the re-shaping of a device into at least one desired shape. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore, it should be noted that unless explicitly stated otherwise, the figures included herein are illustrated diagrammatically and without any specific scale, as they are provided as qualitative illustrations of the concept of the present invention.

In this description, first, a glossary of terms used throughout the application will be presented in order to acquaint the reader with these terms and to provide a central resource to which a reader may refer. Next, a description of a single active shaping element is presented along with a description of its operation. Then, a description regarding various alternate geometric and control configurations based on the principles of the single active shaping element is provided. Finally, a brief description of various material systems that may be used with the invention is provided.

(1) Glossary

The purpose of this glossary is to provide a working frame of reference regarding some of the terms used in the description and claims is given as a central resource for the reader. The glossary is intended to provide the reader with a general understanding of various terms as they are used in this disclosure, and is not intended to limit the scope of these terms. Rather, the scope of the terms is intended to be construed with reference to this disclosure as a whole and with respect to the claims below. Thus, the definitions provided should not be considered limiting to the extent that the terms are known in the art.

Active Shaping Element—Synonymous with a single Deformation Unit.

Actively Deformable Material—An actively deformable material is a portion of an ADMS (see below) and is a material that changes shape in response to stimulation. The change in shape of an actively deformable material structure drives a change in the shape of a selectively deformable material structure and then the selectively deformable material structure is caused to retain a desired shape for the shaping element. Non-limiting examples of actively deformable materials include liquid crystal elastomers, shape memory alloys, magnetostrictive materials, electrostrictive materials, piezoelectric ceramics and polymers, electroactive polymers, ionic polymer gels, ionic polymer metal composites, dielectric elastomers, conductive polymers, carbon nanotubes, and ferrogels.

Actively Deformable Material Structure (ADMS)—An actively deformable material structure is comprised of an actively deformable material and may include a deformation activation element.

Actively Shapeable Structure—A structure comprised of one or more Deformation Units. The structure is arranged such that individual deformation units can be activated, reshaped, and deactivated to hold that new shape. The actively shapeable structure may be comprised of a single deforming unit, or may be comprised of multiple deforming units having either the same or different material combinations and either the same or different geometries. The overall structure may comprise additional passive engineering-type structures that connect with the actively shapeable structure as an application demands.

Deformation Activation Element—A deformation activation element is a mechanism for causing an actively deformable material to change shape or a selectively deformable material structure to become malleable or stiff. The exact configuration of a deformation activation element depends both on the mechanism by which the actively deformable material is induced to change shape or the selectively deformable material is caused to become malleable or stiff and the configuration of an active shaping element. As a non-limiting example, if the actively deformable material changes shape upon application of electric current, the deformation activation element could be a remotely or locally activated electrical circuit that allows current to flow to or through the actively deformable material. In this case, the electrical circuit would be activated when it was desired for the actively deformable material to actuate. As another non-limiting example, in the case of a selectively deformable material structure that becomes malleable when heat is applied, the deformation activation element could be a heating element embedded in the selectively deformable material structure. In this case, the heating element could be activated, heating the selectively deformable material structure, causing it to become malleable. The actively deformable material structure would then be actuated, causing a change in the shape of the active shaping element. The heating element could then be deactivated, allowing the structure to cool and become stiff, effectively "freezing" the active shaping element in its new shape. Generally, deformation activation elements working together permit the achievement of various deformation-types and act as a control mechanism for the deformation unit. Non-limiting examples of deformation types that may be generated by deformation activation elements include multi-directional bending-type deformation, stretching-type or contracting-type deformation, and twisting-type deformation.

Deformation Unit—Units of an actively shapeable structure, each comprised of an actively deformable material structure, a selectively deformable material structure, and an optional passive material structure. Deformation units may be used alone or combined to create larger actively shapeable structures. A deformation unit is synonymous with a single active shaping element.

Passive Material Structure (PMS)—A passive material structure is an optional component of an active shaping element, which may be used in cooperation with the actively deformable material structure and the selectively deformable material structure. Non-limiting examples of uses for a passive material structure include providing an overall measure of structural support for at least a portion of an active shaping element (for example, when the selectively deformable material structure is a liquid, the passive material structure may enclose at least one deformation unit), maintaining a geometrical relationship between at least two of the actively deformable material structures, the selectively deformable material structure, and a deformation activation element, and providing a default shape for the active shaping element. To accomplish such a task, the passive material structure may be formed such that it encloses at least a portion of the SDMS or such that it encloses at least one deformation unit.

Selectively Deformable Material Structure (SDMS)—A selectively deformable material structure is a portion of an active shaping element and is a material that can be made selectively malleable or stiff in response to stimulation. The change in shape of the selectively deformable material structure is driven by a change in the shape of an actively deformable material structure and then the selectively deformable material structure is caused to retain a desired shape for the shaping element (e.g., the selectively deformable material structure "freezes" to retain the shape into which it was driven by the actively deformable material structure). Non-limiting examples of selectively deformable material types that may be used with the present invention include thermally-activated phase transformation materials, thermally-activated glass-forming materials, optically-electrically or magnetically-activated variable viscosity or stiffness materials, and plastically-deformable materials. Non-limiting examples of specific phase transformation materials include elements and compounds which reversibly transform from a solid form to a fluid form, such as many metals and alloys, polymers, waxes, ice/water, etc. Non-limiting examples of specific glass-forming materials include shape memory polymers, amorphous metals, amorphous semiconductors, amorphous glasses, and amorphous polymers. Non-limiting examples of specific variable viscosity or stiffness materials include chalcogenide glasses, electrorheological fluids, electrorheological elastomers, magnetorheological fluids, and magnetorheological elastomers. Non-limiting examples of plastically deformable materials include metals, thermoplastics, baroplastics, and other polymers. In some cases, it may be desirable for the selectively deformable material structure to be capable of "setting" through a non-reversible mechanism. Non-limiting examples of materials that may be used in a non-reversible capacity, include photopolymerizable materials, curable materials, irreversibly cross-linkable polymers, additively-induced curing materials, subtractively-induced curing materials, reactively-induced curing materials, signal-catalytically curing materials, crystallizing materials, sol gels, and thermally curing materials.

With these definitions established, next the details of a single active shaping element will be discussed.

(2) Single Active Shaping Element

A single active shaping element is generally comprised of an actively deformable material structure (ADMS) and a selectively deformable material structure (SDMS). The ADMS, when activated, changes shape, altering the overall shape of the active shaping element. Once shaped by the ADMS, the SDMS is affixed in its shape (frozen) to retain the altered shape of the active shaping element. In addition to the ADMS and the SDMS, a passive material structure (PMS) may also be included. An example of a class of ADMS is shape memory alloys (SMAs), and an example of a class of SDMS is shape memory polymers (SMPs). In this section, the active shaping element will be discussed in the context of these material classes (as non-limiting examples).

ADMSs operate by deforming when actuated by a triggering stimulation from a deformation activation element, such as the reception of electrical current from a power element in the case of shape memory alloys (SMAs). In the specific case of SMAs, when the power element is turned on, the SMA deforms and when it is turned off, the SMA returns to its original state. Thus, single pieces of SMAs generally have two states (shapes)—a powered state and an un-powered state. Without a continuous supply of power, an ADMS such as a SMA will not, on its own, retain its stimulated/powered state. The approach presented here acts to mitigate this drawback of ADMSs by combining them with SDMSs such as shape memory polymers (SMPs), which have the opposite characteristic: in an un-stimulated (un-powered) state they are stiff, but when stimulated/powered they become highly elastic. This combination enables a new class of actively shapeable structures with increased strength in the power off condition. This invention combines a network of ADMS and SDMS with a network of deformation activation elements, which may be activated using independently addressable triggering of deformation activation elements to form a deformable geometric shape that can be commanded into a deformed state and frozen in place. In the specific example presented in FIG. 1 and discussed in this section, SMAs are electrically stimulated and SMPs are thermally stimulated/activated. The control mechanism or deformation activation element for the SMA is typically a set of power elements, which may be in the form of a network of independently addressable power electronics. The control mechanism or deformation activation element for the SMP is typically a set of heating elements, which may be in the form of a network of independently addressable heating elements. It is noteworthy that many SMAs and SMPs can be actuated by the application of heat. Depending on their formulation, the reversible softening and stiffening SMPs may also be triggered by the application of light, radio-frequency (RF) energy, magnetic fields, electric fields, ultrasound, and chemical fields. Depending on actuation speed requirements, some of these other triggering mechanisms may be more or less desirable.

The concept just presented can be considered in the context of 'mechatronic' structures where both structural stability and shape control are provided by the materials themselves. The SMA material is used to actively shape the structure through its well-documented shape memory effect, which can be tailored to occur with high force and high displacement. The SMP material, however, is used, not in its traditional shape memory mode, but rather for its distinct properties of radical modulus change between low and high temperature. The power electronics are used to independently address and stimulate specific parts of the structure to activate the SMP material into its high-temperature flexible phase and simultaneously activate the SMA material. As noted previously, the SMA and SMP materials are non-limiting examples of materials that may be used as ADMS and SDMS, respectively, and that the focus on them in this section is for clarity of description only.

Actively deformable surfaces and structures such as those contemplated by the present invention, have a wide variety of potential applications in areas such as actively shaped antenna structures, mandrel shaping, rapid prototyping, active air- and hydrofoils, engine components, exterior and interior body panels, ergonomics, and other actively shaped structures.

A cross-sectional view of the structural design of a single active shaping element of the present invention is shown in FIG. 1a. The active shaping element 100 includes an SDMS 102, depicted in the form of an SMP. The SDMS 102 forms the body of the structure, and may be in any desirable shape, non-limiting examples of which include a rod, a cylinder, a bar, or a sheet. The SDMS 102 is the primary contributor to bending stiffness of the element. Depicted on the top and bottom and attached to, or embedded below, the surfaces of the SDMS 102 are components of an ADMS 104. The ADMS 104 is typically in the form of SMA actuator wires or sheets. Power and control wiring 106 may be embedded in the SDMS 102 to provide power for heating the SDMS 102 to permit bending. The power and control wiring 106 may be formed so that it acts as heating element and can be connected with the ADMS 104 using connectors 108. Other electronics may be included, such as power electronic modules 110 that permit the SDMS 102 and the ADMS 104 to be independently activated. Furthermore, the plurality of active shaping elements 100 may be combined to create a larger structure, with the active shaping elements being independently addressable to allow for intricate control of the overall shape of the structure.

Figure 1B:
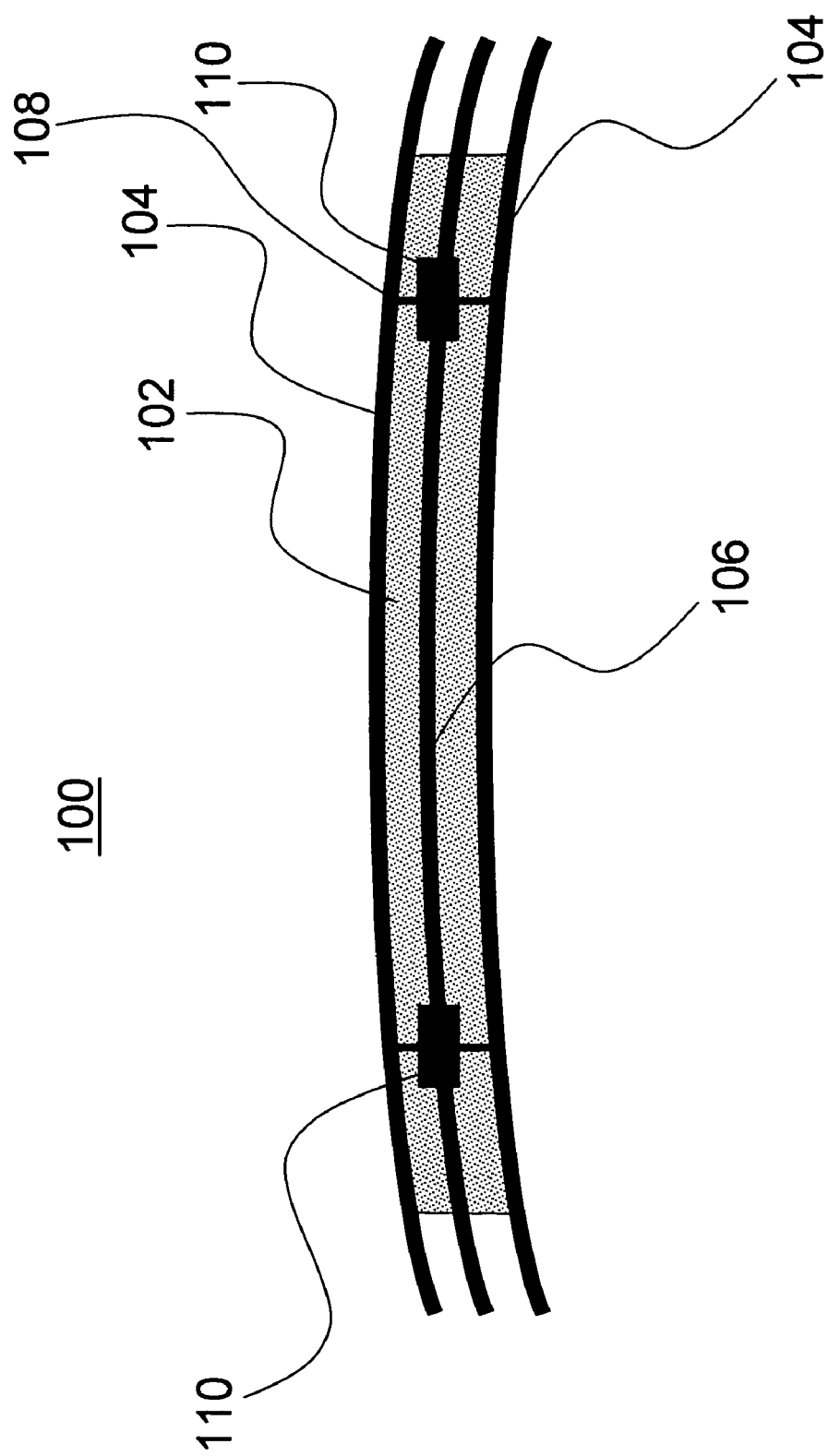
FIG. 1b is a cross-sectional view of the hybrid active deformable material structure of FIG. 1a in deformed state.

The operation of the active shaping element 100 is as follows. For a particular active shaping element 100 in an overall structure, deformation activation elements, in this case power (heating) elements, are activated, causing the SDMS 102, in the case of an SMP, to transform from its low temperature phase, which is stiff, to its high temperature phase, which is significantly more elastic. The particular temperature of this transformation can be adjusted by the specific formulation of the SMP material. Once the SMP material has softened, either the top or bottom portion (top/bottom being with respect to the device shown in FIG. 1) of the ADMS 104, in the case of an SMA, can be activated by passing current through the SMA (typically where the current is supplied by a deformation activation element), thereby heating it and causing it to contract. This contraction causes the entire structure to bend by an amount that depends on the thickness of the SMP material and the degree of contraction in the SMA. Concurrent with the contraction of one portion of the ADMS 104 (e.g., the portion on the top of the SDMS 102), the complementary portion of the ADMS 104 (e.g., the portion on the bottom of the SDMS 102) is stretched in its low temperature phase. The transformation temperatures of the SMA and SMP materials are chosen such that the SMP softening will not interfere with the SMA actuator activation, and vice versa. The resulting deformed shape is shown in FIG. 1b.

In addition to the SDMS 102 and the ADMS 104, a passive material structure (PMS) may be included in an active shaping element 100.

Fabrication of such structural elements may require specific processing. For example, in order to properly and antagonistically actuate, the SMA elements must be 'pre-set' by straining or stretching prior to embedding in the SMP material. In order to retain this preset strain throughout processing, the SMA material must be kept below its transformation temperature. This favors processing techniques such as solvent casting or two-component mixing/curing, as opposed to melt casting or any other high temperature processing method.

Figure 2C:
FIG. 2c is a is a photograph of a single-element hybrid active deformable material structure according to the present invention, where the structure is actuated to the left.
Figure 2B:
FIG. 2b is a is a photograph of a single-element hybrid active deformable material structure according to the present invention, where the structure is actuated to the right.
Figure 2A:
FIG. 2a is a photograph of a single-element hybrid active deformable material structure according to the present invention, where the structure is in a neutral state.

The operation of an active shaping element similar to that presented in FIG. 1 is demonstrated in the various photographs of FIG. 2. A photograph of a single-element hybrid active deformable material structure according to the present invention, where the structure is in a neutral state, is shown in FIG. 2a. The structure shown in FIG. 2a is shown actuated to the right and left, respectively, in FIG. 2b and FIG. 2c. It should be appreciated that various other bending types, including stretching and twisting-type bending can be accomplished through different material and geometric configurations.

Now that the basic features of a single active shaping element have been described, a variety of alternate geometric configurations will be presented. These configurations are not intended to provide an exhaustive set of possibilities. Rather, they are presented to provide the reader with a general understanding of ways in which the present invention may be adapted to a variety of situations and to provide a starting point from which to understand how the present invention may be adapted for a variety of specific purposes.

(3) Alternate Geometric and Control Configurations

The foundation laid in the previous section regarding the single active shaping element may be extended to a variety of alternate configurations. The configurations presented in this section can be developed as alternate versions of a single active shaping element or they may be comprised of a set of single active shaping elements working in conjunction. In addition to various geometric configurations, various aspects of control mechanisms for the elements will be discussed. In the configurations shown, unless stated otherwise, as non-limiting examples, the ADMS materials are assumed to be selected such that they can be stimulated electrically and the SDMS materials are assumed to be selected such that they can be stimulated with heat.

Figure 3:
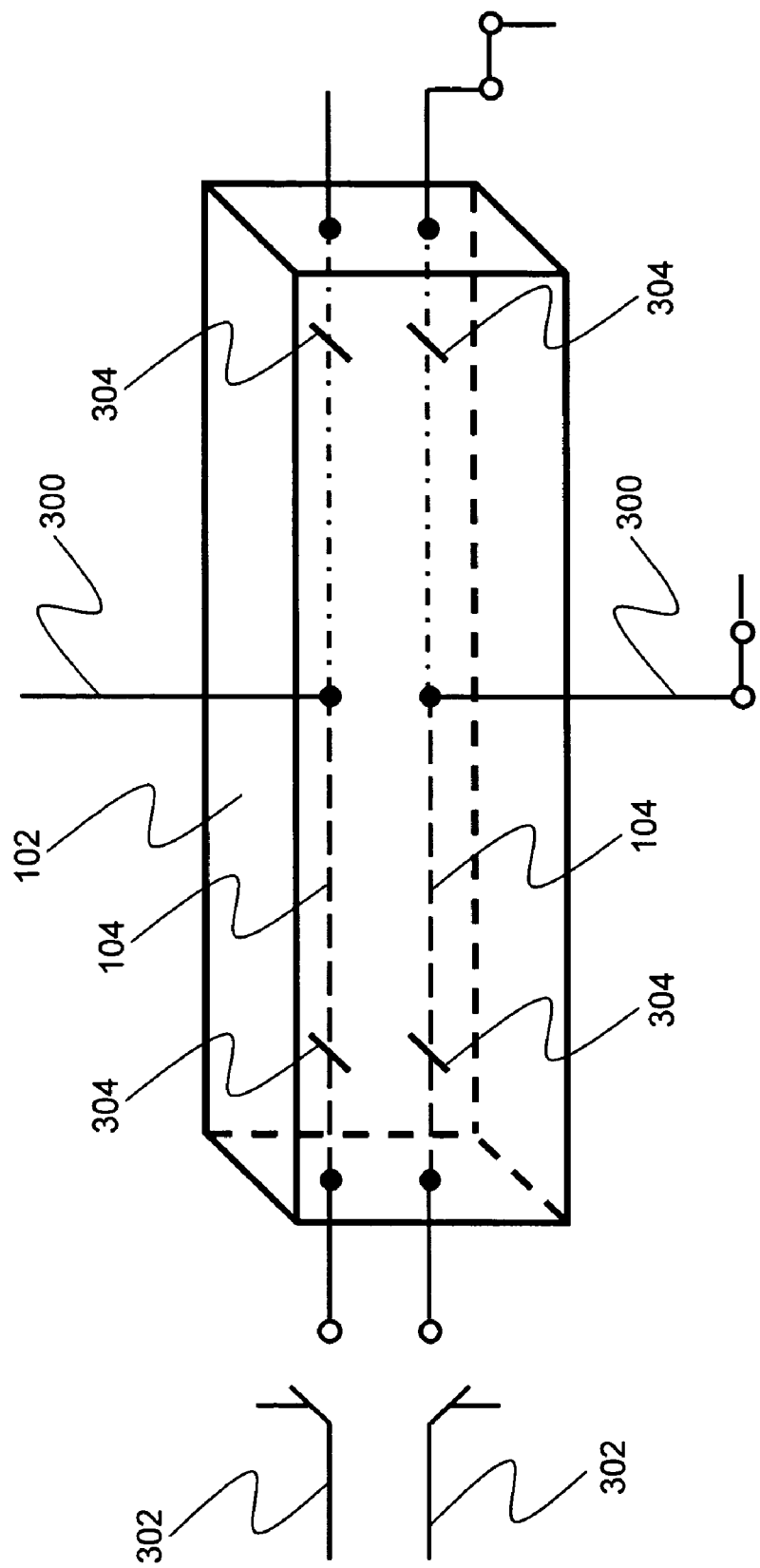
FIG. 3 is an illustration of a one-dimensionally deforming single-element material structure according to the present invention, demonstrating the integration of activation nodes along a length of the structure.

An illustration of a one-dimensional single-element active material structure is shown in FIG. 3, demonstrating several features of interest. In this illustration, two lengths of an ADMS 104 material are provided and are aligned essentially co-axially within a block of SDMS 102. Electrical connections 300 along with switches 302 control the electrical flow through the ADMS 104. Also illustrated are locking mechanisms 304 to ensure that the lengths of ADMS 104 do not move relative to the SDMS 102. The locking mechanisms 304 may take any appropriate form, non-limiting examples of which include extrinsic locking devices such as screws, tacks, staples, and glues, and intrinsic locking devices such as rough spots and hooks built into the ADMS. The two lengths of ADMS 104 permit this version of the invention to be actuated as was shown in FIG. 2. Alternately, opposing portions of the ADMS elements 104 may be activated by closing the upper right and lower left switches 302. By this method of activation, the structure can take on an "S" shape. By proper combination of ADMSs and SDMSs, the structure may take on more complex mode shapes than the simple up, down, and straight shapes illustrated in FIG. 2. Also note that no mechanism for heating the SDMS material is explicitly shown in FIG. 3. A heating mechanism for such a version may be external or may be embedded in the system of electrical connections.

Figure 4:
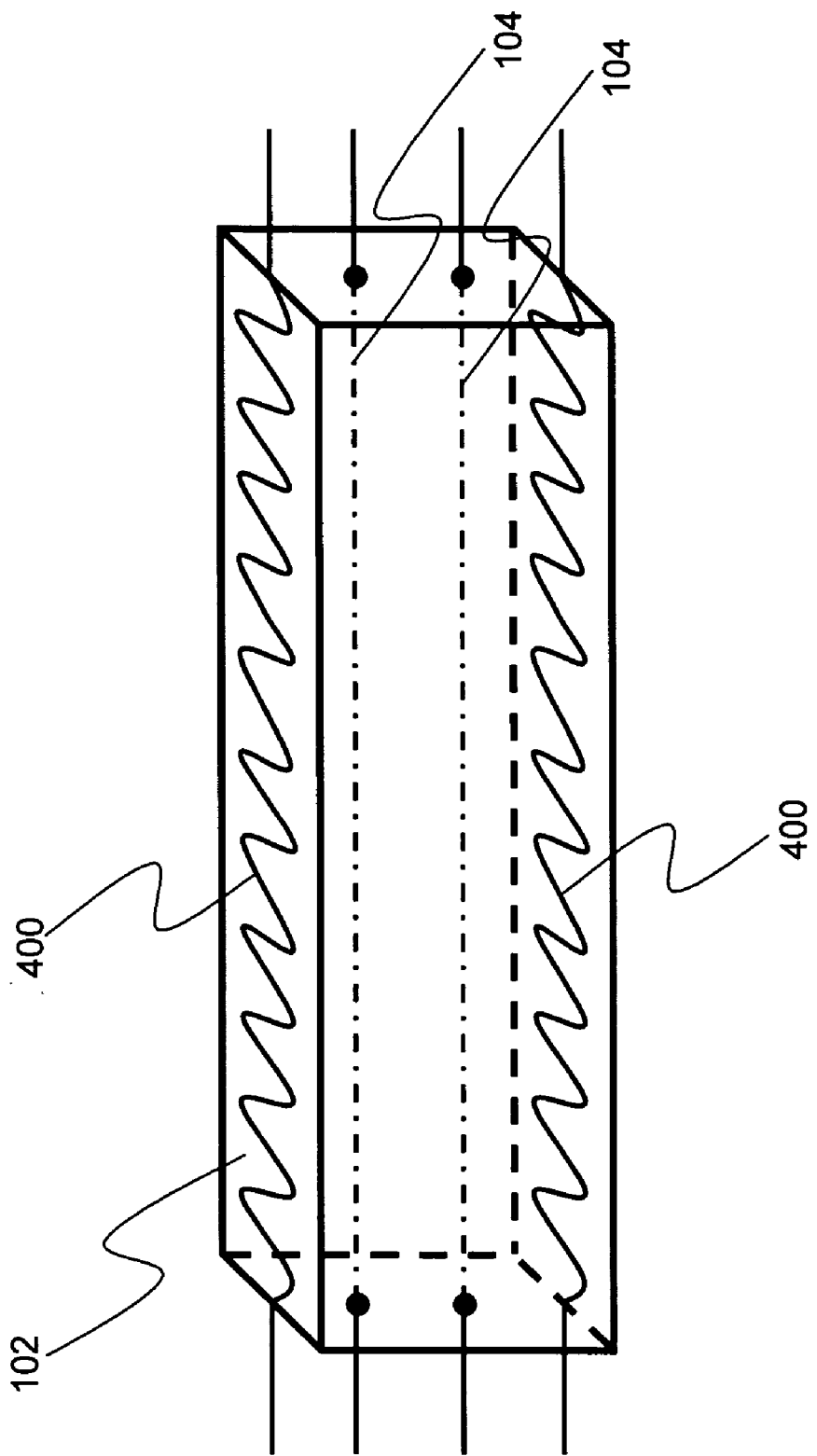
FIG. 4 is an illustration of a one-dimensionally deforming single-element material structure according to the present invention, demonstrating the integration of heating elements along a length of the structure.

Again focusing on the case where the SDMS is a thermally activated SMP, the heater elements can be placed at the outer portions of the structure in a more optimal placement than shown in FIG. 1. An illustration of a one-dimensional single-element material structure like that shown in FIG. 3, demonstrating the integration of heating elements 400 (the deformation activation element for the ADMS) along a length of the structure, is shown in FIG. 4. The heating elements 400, as shown, are comprised of lengths of wire. Upon receiving an electrical signal, the wire acts by resistively heating. The heat is transferred to the SDMS 102, causing it to become pliable so that the ADMS 104 can adjust the shape of the material structure. Once the structure is in a desired shape, the current to the heating elements 400 is turned off and the structure "freezes" in place. Heating the outer portions of the structure is advantageous because cooling will occur faster at the surface than in internal portions of the structure. Because the outer portions of the beam have a greater influence on the overall bending modulus of the structure, faster changes in bending modulus can be affected. As with the version shown in FIG. 3, this version can be manipulated like that shown in the photographs of FIG. 2.

Figure 5:
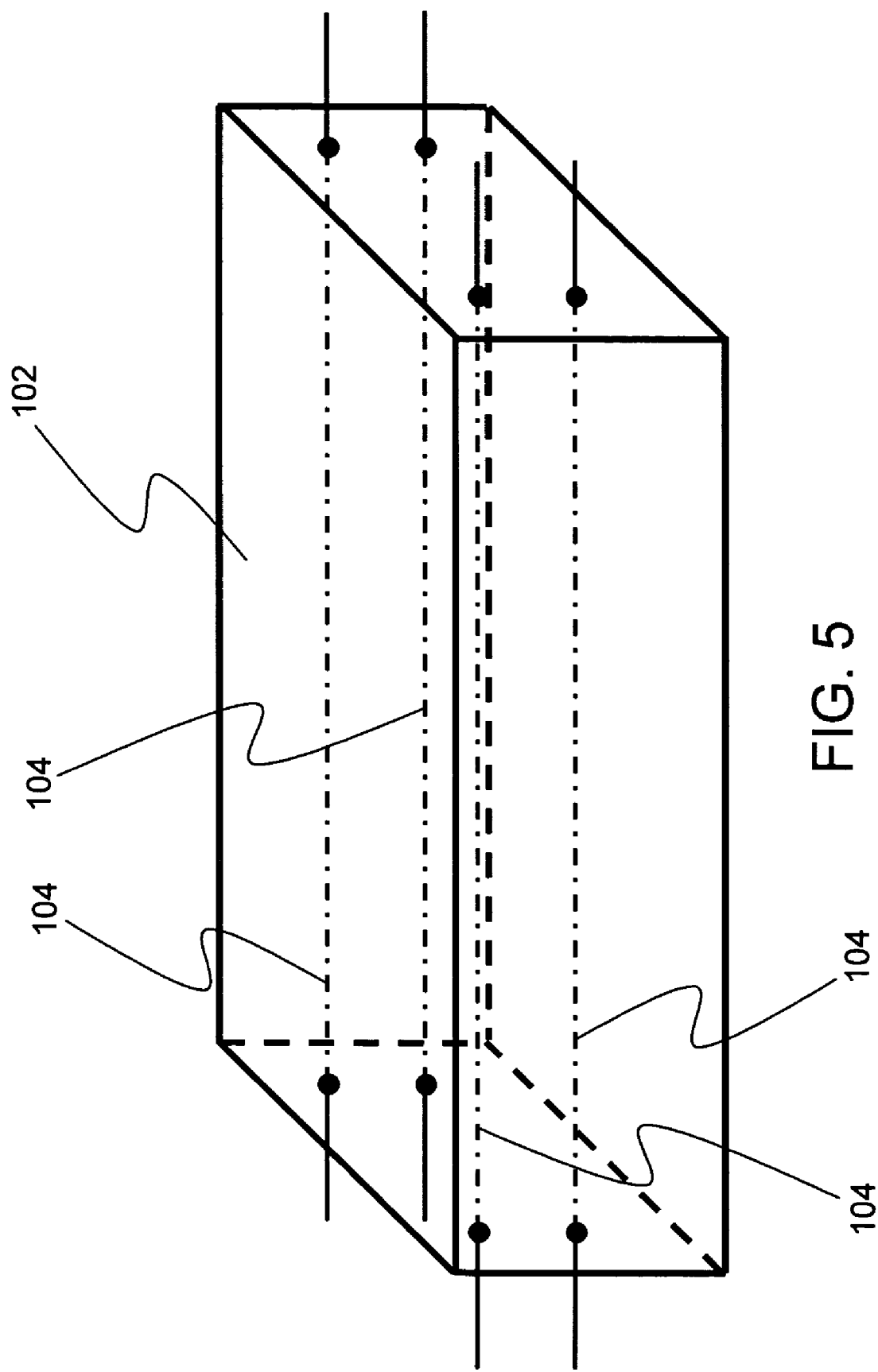
FIG. 5 is an illustration of a pseudo two-dimensional single-element material structure according to the present invention.

An illustration of a pseudo two-dimensional single-element material structure is shown in FIG. 5. In this version, four lengths of ADMS 104 are provided. Single ones or groups of lengths of ADMS 104 can be actuated when the SDMS 102 is pliable to cause the structure to deform in two dimensions. Note also that the block of SDMS 102 can be formed in any desired shape (such as a cylinder) to facilitate proper flexing.

Before continuing with further versions of material structures according to the present invention, two non-limiting versions of control circuitry (deformation activation elements) that can be used either for the addressable electrical control of an ADMS 104 or for addressable heating of an SDMS 102 are presented in FIG. 6.

Figure 6A:
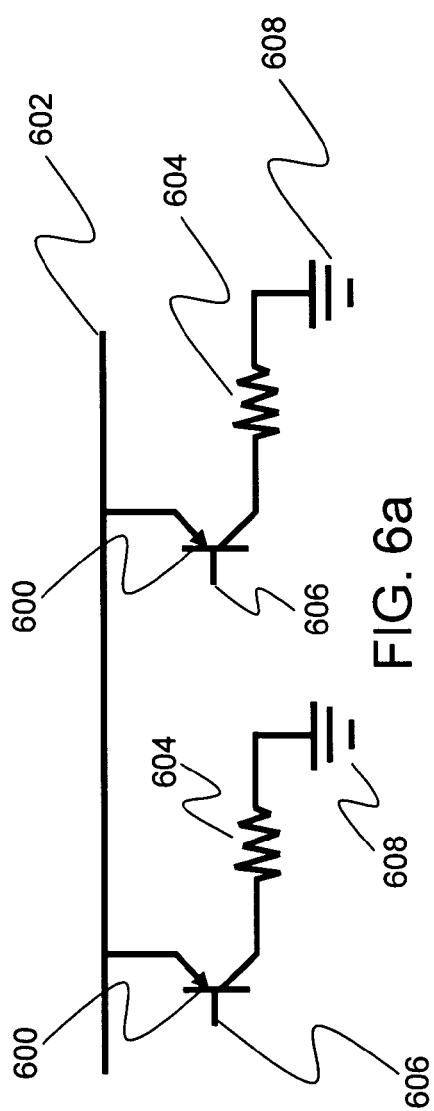
FIG. 6a is an illustration of an exemplary heating circuitry that may be embedded in a material structure according to the present invention.

A first example of the control circuitry is shown in FIG. 6a. The control in this case is performed by transistors 600 connected to an electrical source 602 and with a resistive element 604. A control signal is connected with the base 606 of each transistor 600 so that the transistors 600 operate as switches, selectively passing electricity between the electrical source 602 and a sink 608 such as ground. By permitting selective passage of electricity through different resistive elements 604, the circuitry permits selective addressing of different portions of an active material structure. Note that the same circuitry may be used for controlling segments of the ADMS 104 or for controlling heating elements, where the resistive elements are the segments of ADMS 104 or heating elements, respectively.

Figure 6B:
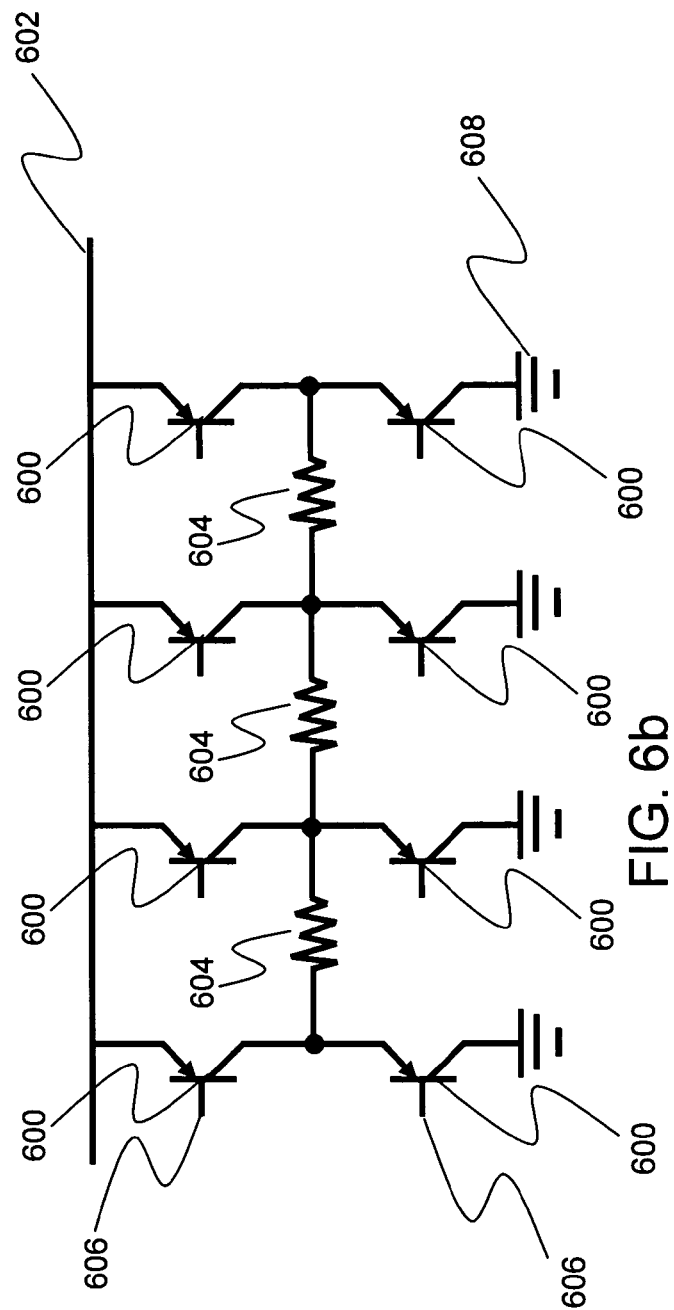
FIG. 6b is an illustration of another exemplary heating circuitry that may be embedded in a material structure according to the present invention.

A second example of the control circuitry is shown in FIG. 6b. In this example, as will be appreciated by those of skill in the art, various combinations of the transistors 600 can be activated to actuate different combinations of resistive elements 604.

As will be apparent to one of skill in the art, many control circuitry variations can be developed. Additionally, non-electrical functional equivalents of the control circuitry can be used for non-electrically stimulated ADMSs and SDMSs, as will be discussed in the section below regarding material systems. The control circuitry may be operated in a variety of manners, and may be designed to operate through direct control or wirelessly (for example, a series of photodiodes could be placed on a material structure so that selective lighting of different parts of the structure can be used to selectively activate the different parts to cause a desired deformation to occur).

Figure 7:
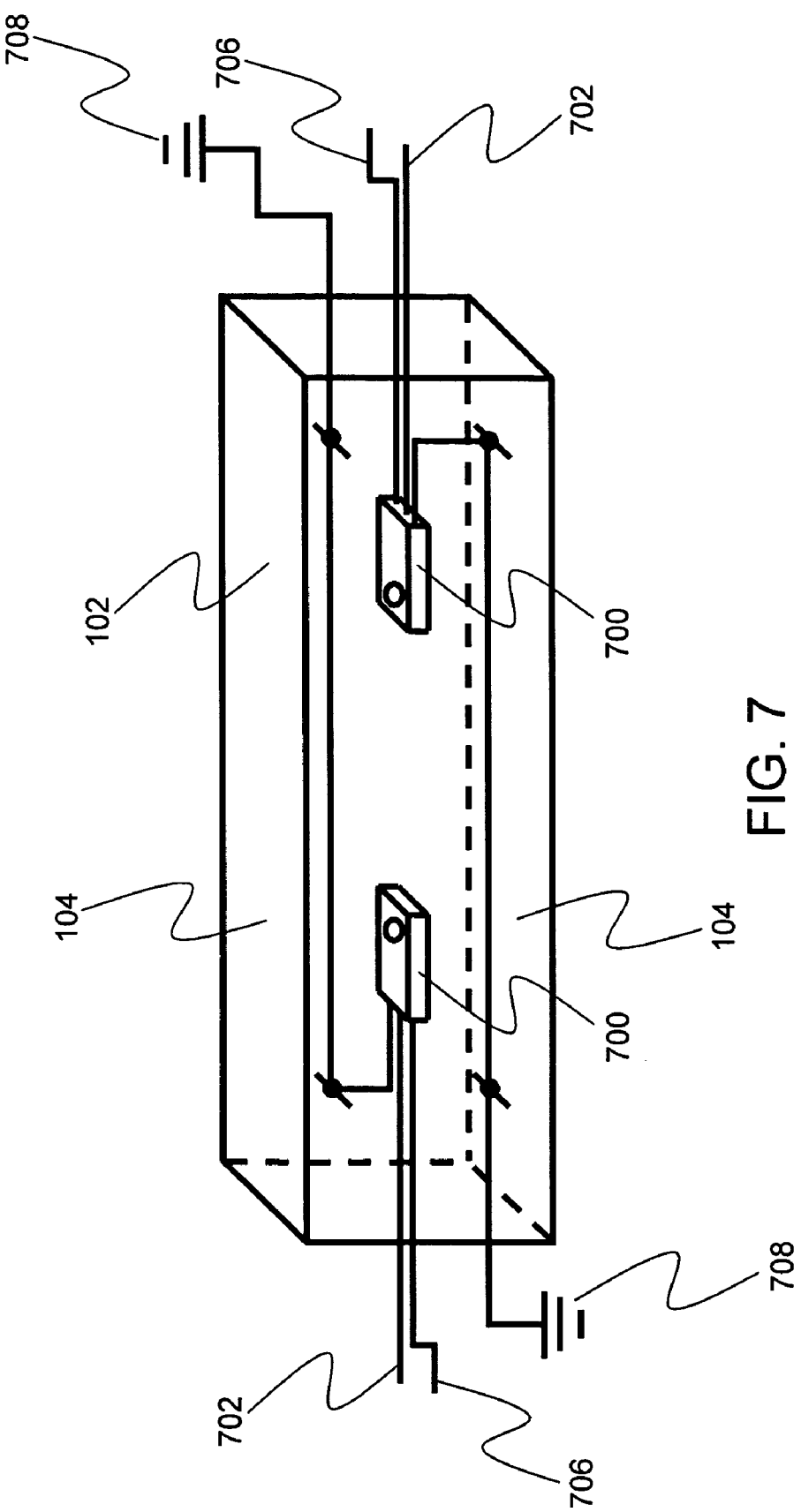
FIG. 7 is an illustration of a hybrid active deformable material structure according to the present invention, depicting electronics embedded therein.

An illustration of a hybrid active deformable material structure similar to that shown in FIG. 3, depicting electronics embedded therein, is presented in FIG. 7. In this case, switch circuitry is incorporated in a switch module 700. Although shown as a transistor 600 in FIG. 6, in this example, it will be appreciated that a variety of devices and circuits can be used to perform a switching activity. The switch module receives a control signal 706 which enables electricity to flow from an electrical source 702 through an ADMS 104 to a sink 708. Although depicted as a mechanism for controlling the stimulus to the ADMS 104, the same configuration could be connected to control a heating element 400 as shown in FIG. 4.

Figure 8:
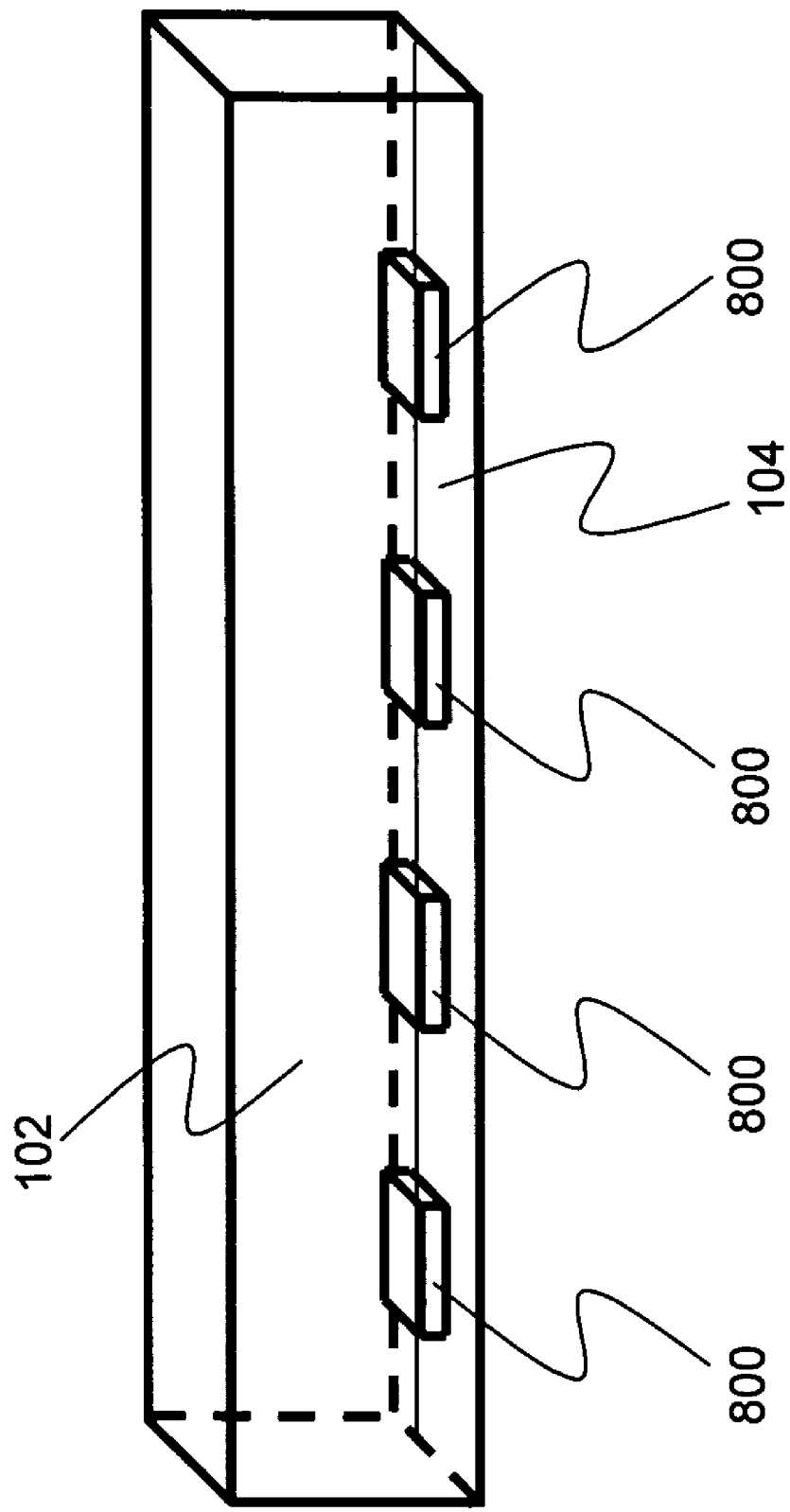
FIG. 8 is an illustration of a hybrid active deformable material structure according to the present invention with a multi-node control system embedded therein.

As shown in FIG. 8, a plurality of switch modules 800 may be incorporated to provide selective control over various portions of a material structure. Note that the various portions of the material structure shown in FIG. 8 may be part of the same material structure/deformation unit or may be a set of attached deformation units and that the materials in deformation unit may be the same as, or different than, the materials used in another deformation unit. Each individually controlled portion of the structure considered part of a multi-node structure where individual ones or groups of switch modules 800 act as control nodes for various functions/parts of the structure.

Now that examples of techniques for controlling material structures have been introduced, various alternate structural configurations will be introduced.

Figure 9:
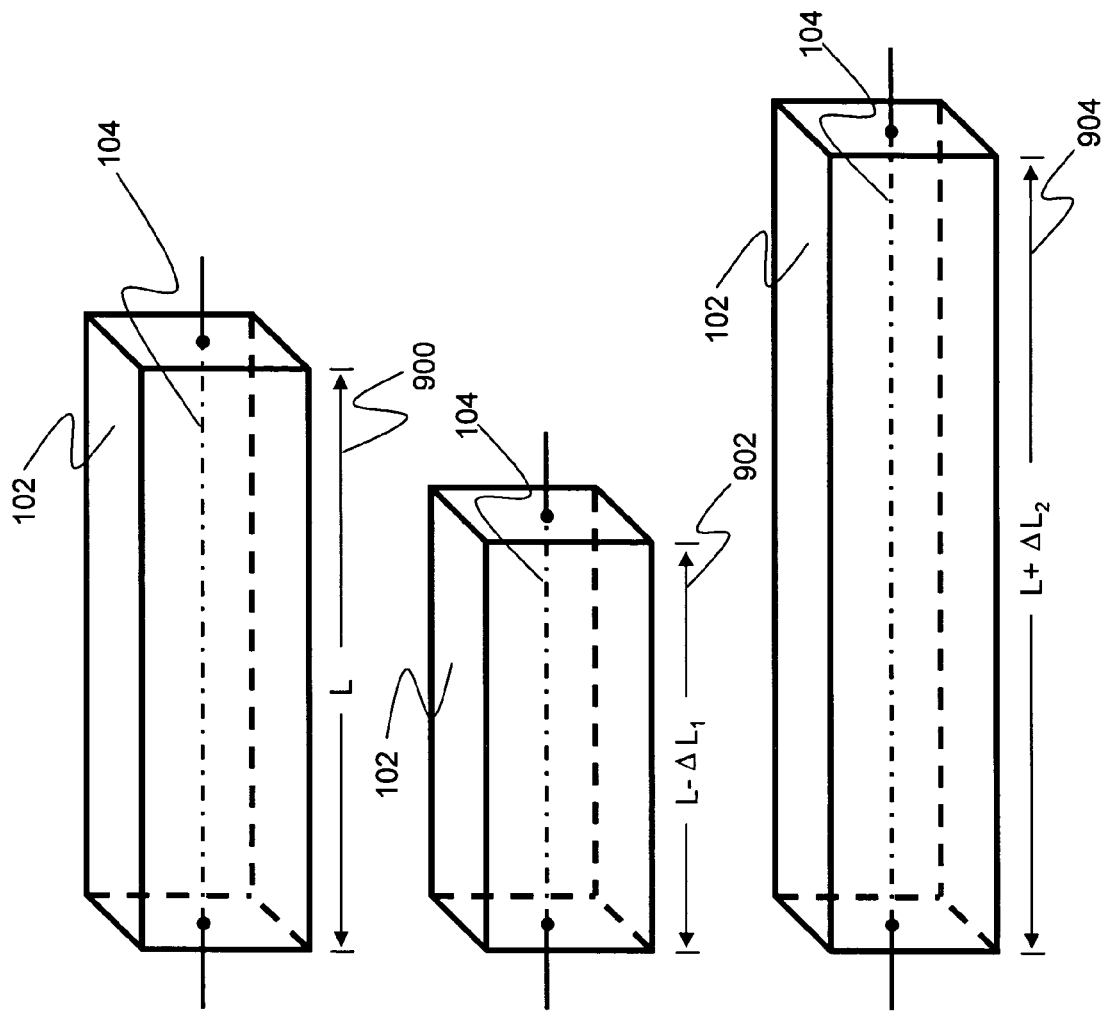
FIG. 9a is an illustration of a material structure according to the present invention that is capable of expansion and contraction.
FIG. 9b is an illustration of the material structure shown in FIG. 9a in a contracted state.
FIG. 9c is an illustration of the material structure shown in FIG. 9a in an expanded state.

An illustration of a material structure according to the present invention that is capable of expansion and contraction (stretching-type deformation) is illustrated in FIG. 9. In this case, the SDMS 102 is selected so that it can selectively expand or contract axially. Depending on the material selection, this can be accomplished either in a constant- or dynamic-volume manner so that a width/diameter of the SDMS 102 remains constant or varies, respectively, with length changes.

An illustration of the material structure with an SDMS 102 having a natural (un-stimulated) length L 900 is shown in FIG. 9a. When activated, the ADMS 104 can contract the SDMS 102 to a shorter length L-$\Delta L_1$ 902, where it may be "frozen" as shown in FIG. 9b. Alternatively, the material structure may be configured so that the ADMS 104 can expand the SDMS 102 to a longer length L+$\Delta L_2$ 904 as shown in FIG. 9c. It is noteworthy that the expansion and contraction may be driven by either the SDMS 102 or the ADMS 104, depending on the materials selected and the particular relative lengths involved.

Figure 10:
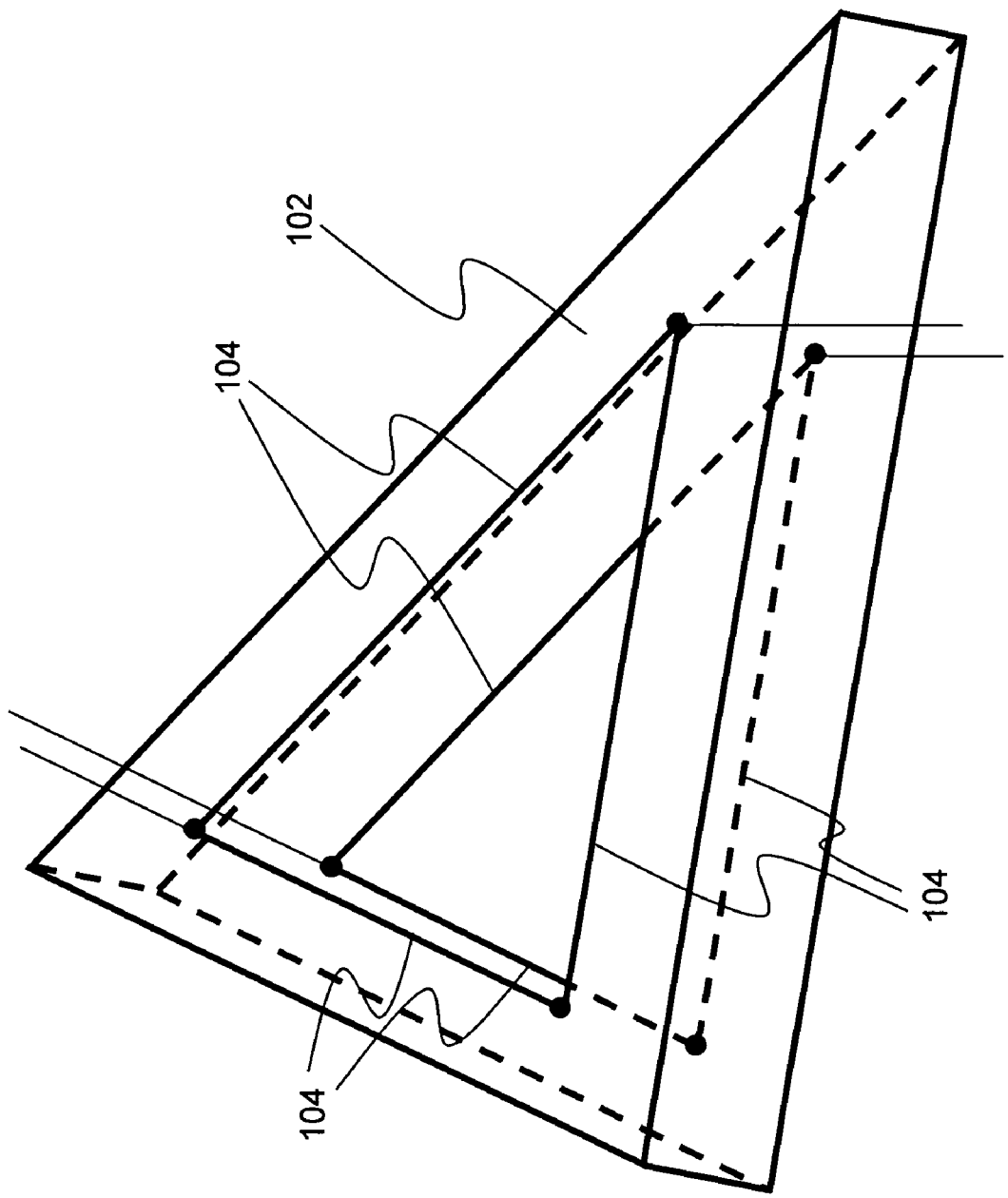
FIG. 10 is an illustration of a true two-dimensional single-element material structure according to the present invention.

A true two-dimensional single-element material structure is shown in FIG. 10. The SDMS 102 in this version is in the shape of a triangular block, as are lengths, of ADMS 104. In this case, when the SDMS 102 is rendered flexible, various combinations of the ADMS 104 may be addressed to cause the SDMS 102 to flex in many different directions.

Figure 11:
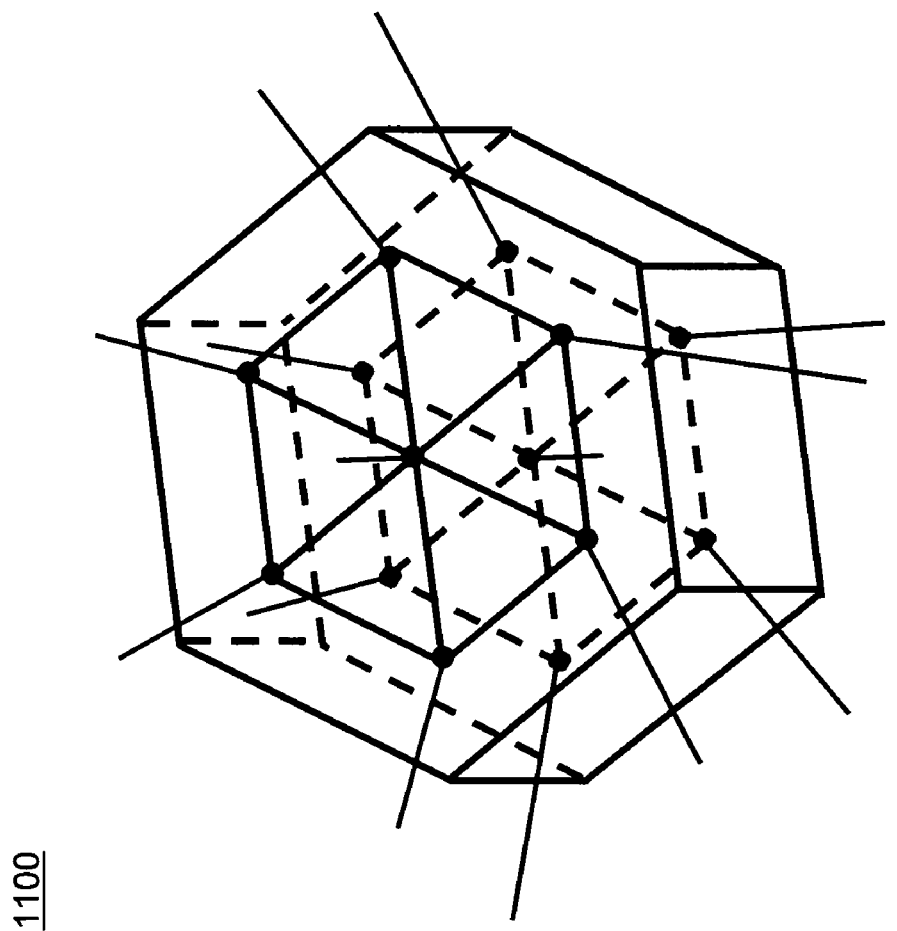
FIG. 11 is an illustration of a multi-nodal true two-dimensional surface material structure according to the present invention.

The structure shown in FIG. 10 may be extended to create a larger, similarly controllable structure as shown in FIG. 11, where the larger structure 1100 may be formed as a single deformation unit or as a composite of multiple homogeneous or heterogeneous deformation units.

Expanding on the same concepts introduced with the material structure depicted in FIG. 11, a truss-type material structure 1200 is depicted in FIG. 12. The truss-type material structure 1200 is shown in FIG. 12a with pairs of SDMSs 102 and ADMSs 104 depicted as diagonal trusses 1202. The diagonal trusses 1202 are connected with top and bottom PMSs 1204. The overall truss-type material structure 1200 has a height H, which may be selectively expanded to a height H+$\Delta H_1$ or contracted to a height H−$\Delta H_2$ by uniform expansion or contraction of the diagonal trusses 1202, as shown respectively in FIG. 12b and FIG. 12c. Alternatively, non-uniform expansion and/or contraction of the diagonal trusses 1202 can cause a non-uniform compression or expansion of the truss-type material structure, as depicted in FIG. 12d.

Figure 13A:
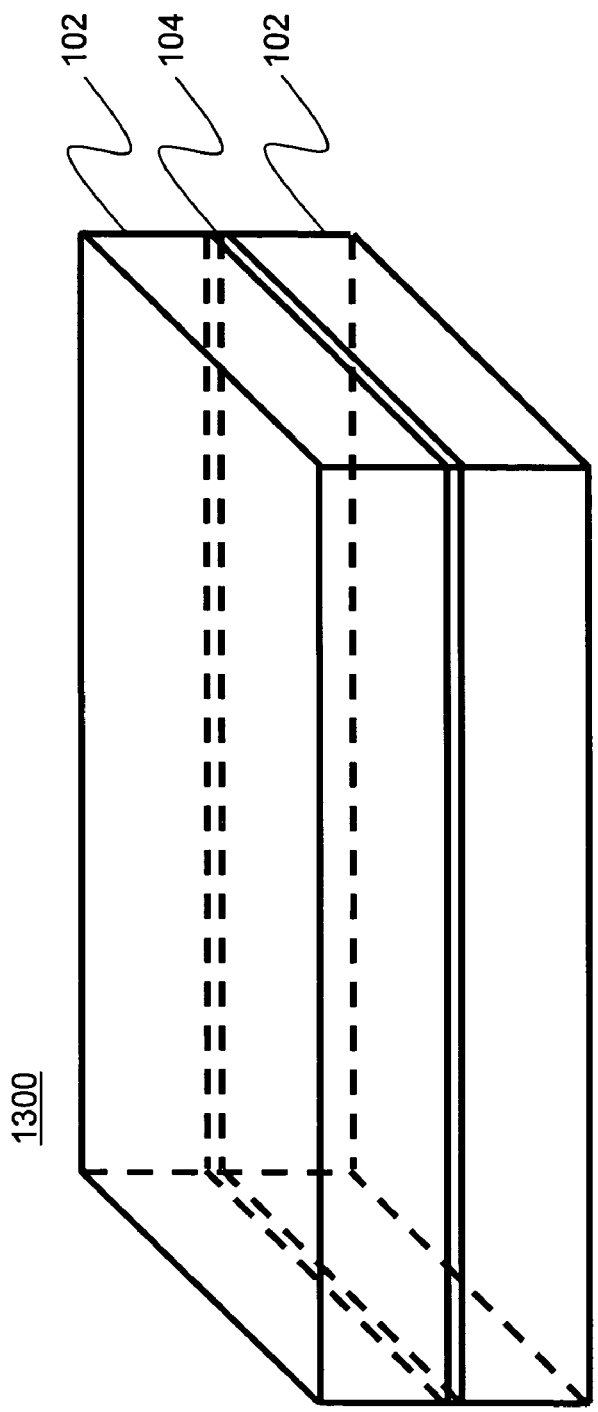
FIG. 13a is an illustration of a material structure according to the present invention that is capable of single-axis bending.

The previous examples have typically utilized ADMSs 104 that have axial expansion/contraction reactions to stimuli. Other ADMSs 104 have bending-type reactions. An example of the use of such reactions is shown in FIG. 13, where FIG. 13a depicts a sandwich-type material structure 1300 having top and bottom layers of an SDMS 102, and a middle layer of an ADMS 104.

Figure 13C:
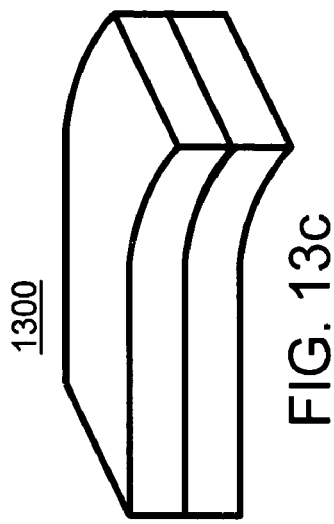
FIG. 13c is an illustration of a material structure as shown in FIG. 13a, depicted in a downwardly bent state.
Figure 13B:
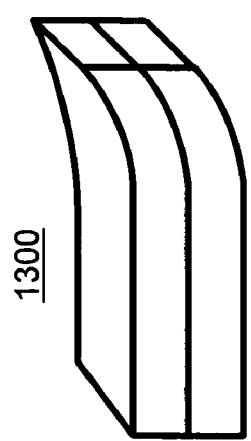
FIG. 13b is an illustration of a material structure as shown in FIG. 13a, depicted in an upwardly bent state.
Figure 15A:
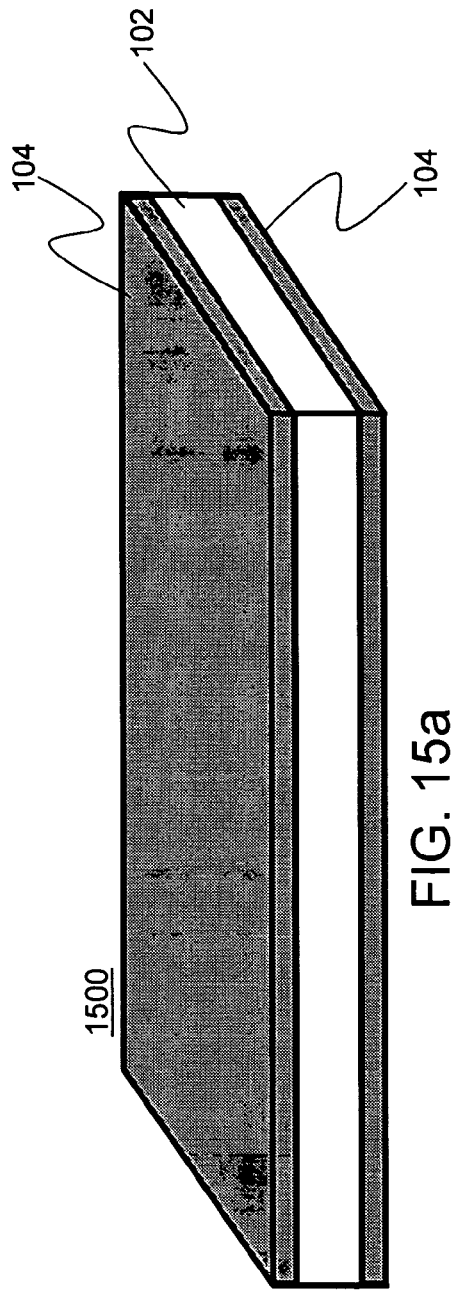
FIG. 15a is a perspective illustration of a material structure according to the present invention that is capable of planar extension-type dual-axis bending.
Figure 15B:
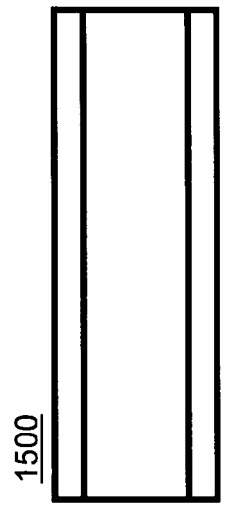
FIG. 15b is a side-view illustration of a material structure as shown in FIG. 15a, depicted in an unbent state.
Figure 15D:
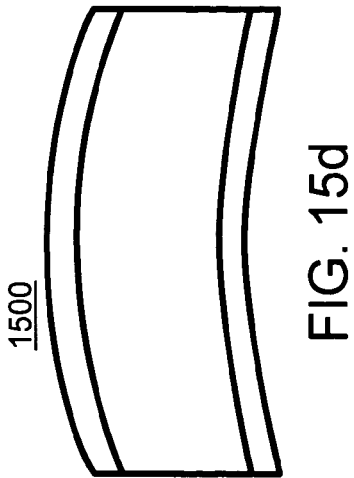
FIG. 15d is an illustration of a material structure as shown in FIG. 15b, depicted in a downwardly bent state.
Figure 15C:
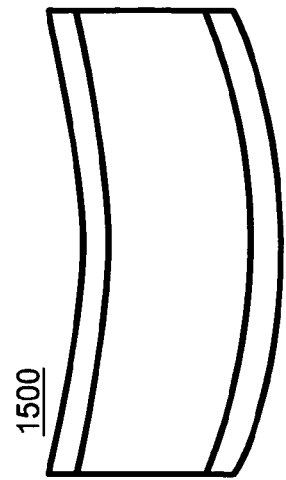
FIG. 15c is a side-view illustration of a material structure as shown in FIG. 15b, depicted in an upwardly bent state.

Depending on the material selected for the ADMS 104, the sandwich-type material structure 1300 can selectively bend in either one direction or both, depending on the applied stimulus. The results of an upward and a downward bending are shown in FIGS. 13b and 13c, respectively. Note that the bending in this case is generally about a single axis.

Another type of bending, termed extension-type one-directional bending, is depicted in FIG. 14. A perspective view of such a structure 1400 is shown in FIG. 14a. In this case, an SDMS 102 is attached on one side with an ADMS 104. Side views of the material structure in an unbent position and a bent position are shown in FIGS. 14b and 14c, respectively. The deformation occurs in response to stimulation from an electrical source 1402.

Building on the material structure shown in FIG. 14, a two-directional bending material structure 1500 is shown in FIG. 15. A perspective illustration of this device is shown in FIG. 15a with an SDMS 102 sandwiched between two ADMSs 104. Side-views of the material structure of FIG. 15a are presented in FIG. 15b, illustrating the material structure in an un-bent state; FIG. 15c, illustrating the material structure in an upwardly concave bent state; and FIG. 15d illustrating the material structure in a downwardly concave bent state. The selective/directional bending occurs through selective activation of the ADMSs 104.

It should be appreciated to one of skill in the art that the examples just described were provided to assist the reader in gaining a better understanding of the design of material structures according to the present invention. The examples just described are intended to be non-limiting and one of skill in the art will appreciate that many other configurations may be created within the scope of the present invention.

Now that a variety of geometric configurations have been presented, the next section will discuss a variety of material systems that can be used to create devices according to the present invention.

(4) Material Systems

A wide variety of materials may be used for the SDMS 102 and the ADMS 104. In order to concisely describe various example materials, tables are presented in FIGS. 16a and 16b with examples of SDMS 102, and FIGS. 17a, 17b, 17c, and 17d with examples of ADMS 104. The tables each have five columns, with the first column providing the name or class of a material. The second column provides a typical activation signal/stimulus that is applied to trigger deformation or freezing of the material. The third column provides examples of mechanisms that can be used to provide the activation signal/stimulus to the material, such as the use of electrical circuitry in the examples provided in the sections above. The fourth column gives examples of the types of deformation that can be achieved using the material. The fifth column provides examples of structural forms that the material can take in their use as parts of deformation units.

What is claimed is:

1. A hybrid active deformable material structure comprising a deformation unit including:
an actively deformable material structure, wherein the actively deformable material structure may be caused to change shape in response to an external stimulus; and
a selectively deformable material structure in cooperation with the actively deformable material structure, wherein the selectively deformable material structure may be caused to become selectively stiff or malleable and deform in response to a change in shape of the actively deformable material structure and, when deformed, to nonreversible retain a shape into which it was deformed.

2. A hybrid active deformable material structure as set forth in claim 1, wherein the actively deformable material structure is formed of at least one material selected from a group consisting of liquid crystal elastomers, shape memory alloys, magnetostrictive materials, electrostrictive materials, piezoelectric ceramics, piezoelectric polymers, electroactive polymers, ionic polymer gels, ionic polymer metal composites, dielectric elastomers, conductive polymers, carbon nanotubes, and ferrogels.

3. A hybrid active deformable material structure as set forth in claim 2, wherein the actively deformable material structure includes a plurality of deformation activation elements positioned about the selectively deformable material to allow for a deformation selected from a group consisting of multi-directional bending deformation, stretching/contracting deformation, and twisting deformation.

4. A hybrid active deformable material structure as set forth in claim 3, further comprising a passive material structure in cooperation with the selectively deformable material structure and the actively deformable material structure.

5. A hybrid active deformable material structure as set forth in claim 4, wherein the passive material structure provides mechanical support for at least a portion of the selectively deformable material structure.

6. A hybrid active deformable material structure as set forth in claim 5, wherein the passive material structure encloses at least a portion of the selectively deformable material structure.

7. A hybrid active deformable material structure as set forth in claim 6, comprising a plurality of deformation units.

8. A hybrid active deformable material structure as set forth in claim 7, wherein the passive material structure encloses at least one deformation unit.

9. A hybrid active deformable material structure as set forth in claim 8, further comprising a deformation activation element functionally connected with the selectively deformable material structure, whereby the deformation activation element may apply a stimulus to the selectively deformable material structure.

10. A hybrid active deformable material structure as set forth in claim 9, wherein the deformation activation element is embedded in the selectively deformable material structure.

11. A hybrid active deformable material structure as set forth in claim 10, wherein the deformation activation element comprises a plurality of addressable activation units corresponding to various ones of the deformation units, whereby a stimulus may be selectively applied to different deformation units.

12. A hybrid active deformable material structure as set forth in claim 11, wherein the selectively deformable material structure is formed of a material selected from a group consisting of photopolymerizable materials, curable materials, irreversibly cross-linkable polymers, additively-induced curing materials, subtractively-induced curing materials, reactively-induced curing materials, signal-catalytically curing materials, crystallizing materials, sol gels, and thermally curing materials.

13. A hybrid active deformable material structure as set forth in claim 12, wherein the passive material structure includes a support portion for maintaining a geometric relationship between at least two of the actively deformable material structures, the selectively deformable material structure, and an activation structure comprised of deformation activation elements.

14. A hybrid active deformable material structure as set forth in claim 13, wherein the selectively deformable material structure is stimulated through heat and where the deformation activation element is a heating element.

15. A hybrid active deformable material structure as set forth in claim 14, further comprising a deformation activation element functionally connected with the actively deformable material structure, whereby the deformation activation element may apply a stimulus to the actively deformable material structure.

16. A hybrid active deformable material structure as set forth in claim 15, wherein the passive material structure sets through a non-reversible mechanism.

17. A hybrid active deformable material structure as set forth in claim 16, wherein the passive material structure is formed of a material selected from a group consisting of photopolymerizable materials, curable materials, irreversibly cross-linkable polymers, additively-induced curing materials, subtractively-induced curing materials, reactively-induced curing materials, signal-catalytically curing materials, crystallizing materials, sol gels, and thermally curing materials.

18. A hybrid active deformable material structure as set forth in claim 1, wherein the actively deformable material structure is formed of at least one material selected from a group consisting of liquid crystal elastomers, shape memory alloys, magnetostrictive materials, electrostrictive materials, piezoelectric ceramics, piezoelectric polymers, electroactive polymers, ionic polymer gels, ionic polymer metal composites, dielectric elastomers, conductive polymers, carbon nanotubes, and ferrogels.

19. A hybrid active deformable material structure as set forth in claim 1, wherein the actively deformable material structure is comprised of a plurality of deformation activation elements positioned about the selectively deformable material to allow for a deformation selected from a group consisting of multi-directional bending deformation, stretching/contracting deformation, and twisting deformation.

20. A hybrid active deformable material structure as set forth in claim 1, further comprising a passive material structure in cooperation with the selectively deformable material structure and the actively deformable material structure.

21. A hybrid active deformable material structure as set forth in claim 20, wherein the passive material structure provides mechanical support for at least a portion of the selectively deformable material structure.

22. A hybrid active deformable material structure as set forth in claim 20, wherein the passive material structure encloses at least a portion of the selectively deformable material structure.

23. A hybrid active deformable material structure as set forth in claim 1, comprising a plurality of deformation units.

24. A hybrid active deformable material structure as set forth in claim 23, further comprising a passive material structure in cooperation with the selectively deformable material structure and the actively deformable material structure and wherein the passive material structure encloses at least one deformation unit.

25. A hybrid active deformable material structure as set forth in claim 1, further comprising a deformation activation element in functionally connected with the selectively deformable material structure so that the deformation activation element may apply a stimulus to the selectively deformable material structure.

26. A hybrid active deformable material structure as set forth in claim 25, wherein the deformation activation element is embedded in the selectively deformable material structure.

27. A hybrid active deformable material structure as set forth in claim 25, wherein the deformation activation element comprises a plurality of addressable activation units corresponding to various ones of the deformation units, whereby a stimulus may be selectively applied to different deformation units.

28. A hybrid active deformable material structure as set forth in claim 1, wherein the selectively deformable material structure is formed of a material selected from a group consisting of photopolymerizable materials, curable materials, irreversibly cross-linkable polymers, additively-induced curing materials, subtractively-induced curing materials, reactively-induced curing materials, signal-catalytically curing materials, crystallizing materials, sol gels, and thermally curing materials.

29. A hybrid active deformable material structure as set forth in claim 1, further comprising a passive material structure in cooperation with the selectively deformable material structure and the actively deformable material structure and wherein the passive material structure includes a support portion for maintaining a geometric relationship between at least two of the actively deformable material structure, the selectively deformable material structure, and an activation structure comprised of deformation activation elements.

30. A hybrid active deformable material structure as set forth in claim 1, further comprising a deformation activation element in functionally connected with the selectively deformable material structure so that the deformation activation element may apply a stimulus to the selectively deformable material structure where the selectively deformable material structure is stimulated through heat and where the deformation activation element is a heating element.

31. A hybrid active deformable material structure as set forth in claim 1, further comprising a deformation activation element functionally connected with the actively deformable material structure, whereby the deformation activation element may apply a stimulus to the actively deformable material structure.

32. A hybrid active deformable material structure as set forth in claim 1, further comprising a passive material structure in cooperation with the selectively deformable material structure and the actively deformable material structure, with the passive material structure selected such that the passive material structure sets through a non-reversible mechanism.

33. A hybrid active deformable material structure as set forth in claim 16, further comprising a passive material structure in cooperation with the selectively deformable material structure, wherein the passive material structure is formed of a material selected from a group consisting of photopolymerizable materials, curable materials, irreversibly cross-linkable polymers, additively-induced curing materials, subtractively-induced curing materials, reactively-induced curing materials, signal-catalytically curing materials, crystallizing materials, sol gels, and thermally curing materials.

34. A method for making a hybrid active deformable material structure comprising acts, for forming a deformation unit, of:
  providing an actively deformable material structure, wherein the actively deformable material structure may be caused to change shape in response to an external stimulus;
  providing a selectively deformable material structure; and
  placing the selectively deformable material structure in functional cooperation with the actively deformable material structure, wherein the selectively deformable material structure may be caused to become selectively stiff or malleable and deform in response to a chance in shape of the actively deformable material structure and, when deformed, to nonreversibly retain a shape into which it was deformed.

35. A method for making a hybrid active deformable material structure as set forth in claim 34, comprising further acts of forming a deformation unit by placing a deformation activation element functionally connected with the selectively deformable material structure, whereby the deformation activation element may apply a stimulus to the selectively deformable material structure.

36. A method for making a hybrid active deformable material structure as set forth in claim 35, comprising further acts of forming a deformation unit by functionally connecting a deformation activation element with the actively deformable material structure, whereby the deformation activation element may apply a stimulus to the actively deformable material structure.

37. A method for making a hybrid active deformable material structure as set forth in claim 36, comprising further acts of forming a deformation unit by providing passive material structure in cooperation with the selectively deformable material structure and the actively deformable material structure.

38. A method for making a hybrid active deformable material structure as set forth in claim 34, comprising further acts of forming a deformation unit by a deformation activation element functionally connected with the actively deformable material structure, whereby the deformation activation element may apply a stimulus to the actively deformable material structure.

39. A method for making a hybrid active deformable material structure as set forth in claim 34, comprising further acts of forming a deformation unit by providing passive material structure in cooperation with the selectively deformable material structure and the actively deformable material structure.

40. A method for actuating a hybrid active deformable material structure, comprising acts for deforming a deformation unit comprised of an actively deformable material structure in functional cooperation with a selectively deformable material structure, wherein the actively deformable material structure may be caused to change shape in response to a stimulus and the selectively deformable material structure may be caused to become selectively stiff or malleable in response to a stimulus, by:

stimulating the selectively deformable material structure to cause the selectively deformable material structure to become malleable;

stimulating an actively deformable material structure, causing the deformation unit to deform to a desired shape; and de-stimulating the selectively deformable material structure to cause the deformation unit to nonreversible retain the shape into which it was deformed.

\* \* \* \* \*